(12) United States Patent
Fuse

(10) Patent No.: US 6,928,246 B2
(45) Date of Patent: Aug. 9, 2005

(54) OPTICAL TRANSMISSION SYSTEM FOR FREQUENCY-MULTIPLEXED SIGNAL

(75) Inventor: Masaru Fuse, Toyonaka (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 10/681,255

(22) Filed: Oct. 9, 2003

(65) Prior Publication Data

US 2004/0076433 A1 Apr. 22, 2004

Related U.S. Application Data

(62) Division of application No. 09/593,659, filed on Jun. 13, 2000.

(30) Foreign Application Priority Data

Jun. 14, 1999 (JP) .......................................... 11-166645

(51) Int. Cl.[7] .............................................. H04J 14/02
(52) U.S. Cl. ............................. 398/79; 398/42; 398/91; 398/140; 398/141; 398/182; 398/183; 398/187; 398/200; 398/201; 398/202; 398/208; 398/209; 398/214
(58) Field of Search ............................. 398/42, 79, 91, 398/140, 141, 182, 183, 187, 200, 201, 202, 208, 209, 214, 213

(56) References Cited

U.S. PATENT DOCUMENTS

| | | |
|---|---|---|
| 4,722,081 A | 1/1988 | Fujito et al. |
| 4,768,186 A | 8/1988 | Bodell |
| 4,959,862 A | 9/1990 | Davidov et al. |
| 5,016,242 A | 5/1991 | Tang |
| 5,351,148 A | 9/1994 | Maeda et al. |
| 6,486,986 B1 | 11/2002 | Fuse |

OTHER PUBLICATIONS

"Optical Super Wide–Band FM Modulation Scheme and Its Application to Multi–Channel AM Video Transmission Systems" IOOC 95, Technical Digest, vol. 5, PD. 2–7.
"CNR Characteristics of Optical Video Transmission Systems Using Broadband FM Modulation Scheme", Fuse et al., Institute of Electronics, Information and Communication Engineers Papers, B–1, vol. J81–B–1, No. 9, Sep., 1998 (with English Translation attached).

*Primary Examiner*—Hanh Phan
(74) *Attorney, Agent, or Firm*—Wenderoth, Lind & Ponack, L.L.P.

(57) ABSTRACT

A detector outputs a detection signal indicating amplitude variation of an input frequency-multiplexed signal. An amplitude controller adjusts the amplitude of the frequency-multiplexed signal by referring to the detection signal. A modulator modulates the amplitude-adjusted frequency-multiplexed signal to produce a predetermined modulated signal. A second multiplexer multiplexes the modulated signal and the detection signal to produce a multiplexed signal. An optical transmitter converts the multiplexed signal into an optical signal, and then sends it out to an optical transmission path. An optical receiver converts the received optical signal into an electrical signal. A separator separates the modulated and detection signals from the electrical signal. A demodulator demodulates the modulated signal to output the frequency-multiplexed signal. An amplitude adjuster adjusts the amplitude of the frequency-multiplexed signal by referring to the detection signal to reproduce the original amplitude variation.

17 Claims, 16 Drawing Sheets

FREQUENCY-MULTIPLEXED SIGNAL

FREQUENCY-MULTIPLEXED SIGNAL WITH INSTANTANEOUS
AMPLITUDE VARIATION SUPPRESSED

DETECTION SIGNAL DETECTING INSTANTANEOUS AMPLITUDE
VARIATION OF FREQUENCY-MULTIPLEXED SIGNAL
(AFTER PHASE ADJUSTMENT)

OPTICAL TRANSMISSION SYSTEM FOR FREQUENCY-MULTIPLEXED SIGNAL

This application is a divisional application of application Ser. No. 09/593,659, filed Jun. 13, 2000.

BACKGROUND OF THE INVENTION

1. Field of the Invention

The present invention relates to optical transmission systems and, more specifically, to a system of optically transmitting a frequency-multiplexed signal with a plurality of signals frequency-multiplexed therein.

2. Description of the Background Art

FIG. 14 is a block diagram showing an example of configuration of a conventional optical transmission system for a frequency-multiplexed signal. This optical transmission system is hereinafter referred to as a first background art. In FIG. 14, a multiplexer 1400 to which a plurality of signals having carriers with predetermined different frequencies are supplied; a modulator 1408 to which a signal outputted from the multiplexer 1400 is supplied; an optical transmitter 1404 to which a signal outputted from the modulator 1408 is supplied; an optical receiver 1405 for receiving an optical signal sent from the optical transmitter 1404; and a demodulator 1409 to which a signal outputted from the optical receiver 1405 is supplied.

The operation of the above optical transmission system in the first background art is now described. The multiplexer 1400 frequency-multiplexes the plurality of signals having the carriers with different predetermined frequencies, and outputs a multiplexed signal to the modulator 1408. The modulator 1408 modulates the frequency-multiplexed signal to produce a predetermined modulated signal, and outputs the same to the optical transmitter 1404. For such modulation, a frequency modulation (FM) scheme is used, for example. The optical transmitter 1404 converts the modulated signal into an optical signal, and sends the optical signal to an optical transmission path or the like(not shown). The optical receiver 1405 converts the optical signal received through the optical transmission path into the original electrical modulated signal, and outputs the same to the demodulator 1409. The demodulator 1409 demodulates the modulated signal to reproduce the original frequency-multiplexed signal.

The above described first background art is disclosed in detail in "Optical Super Wide-Band FM Modulation Scheme and Its Application to Multi-Channel AM Video Transmission Systems", IOOC' 95, Technical Digest, Vol. 5 PD2-7, which is incorporated herein by reference. In this optical transmission system, a frequency-multiplexed signal is modulated to be an FM modulated signal, and, after optical transmission, demodulated to be reproduced. This can improve SNR (signal-to-noise ratio) of the demodulated frequency-multiplexed signal by using FM gain in FM transmission. Therefore, multi-channel signals can be transmitted with high quality via a single optical fiber.

FIG. 15 is a block diagram showing another example of configuration of the conventional optical transmission system, which is hereinafter referred to as a second background art. In FIG. 15, the optical transmission system includes a multiplexer 1500 to which a plurality of signals having carriers with different frequencies are supplied; an optical transmitter 1504 to which a signal outputted from the multiplexer 1500 is supplied; and an optical receiver 1505 for receiving an optical signal from the optical transmitter 1504.

The operation of the above optical transmission system in the second background art is now described. The multiplexer 1500 frequency-multiplexes a plurality of signals having carriers with predetermined different frequencies, and outputs a frequency-multiplexed signal to the optical transmitter 1504. The optical transmitter 1504 converts the frequency-multiplexed signal into an optical signal, and sends the same to an optical transmission path or the like. The optical receiver 1505 converts the optical signal received via the optical transmission path into the original electrical frequency-multiplexed signal.

In the second background art, a frequency-multiplexed signal is directly converted into an optical modulated signal for optical transmission. Therefore, unlike the first background art, SNR improvement with FM gain cannot be achieved in this transmission system. However, multi-channel signals can be transmitted with simpler structure and low cost via a single optical fiber.

The conventional optical transmission system as described in the first background art can achieve multi-channel signal transmission using an optical fiber with high quality.

However, in the first background art, the following problems may arise due to the characteristics of the frequency-multiplexed signal. The frequency-multiplexed signal is generated by frequency-multiplexing a plurality of signals with different frequencies and phases. The instantaneous amplitude of such frequency-modulated signal is not constant and varies with time. FIG. 16 is a graph illustrating instantaneous amplitude variations on a time axis. As shown in FIG. 16, when a plurality of signals with different frequencies and phases are frequency-multiplexed, coincidences of their peaks in amplitude cause an instantaneous amplitude increase of the frequency-multiplexed signal at a certain time.

In the optical transmission system as described in the first background art, the frequency spectrum width of the modulated signal is determined in FM modulation according to the amplitude of the frequency-multiplexed signal. Therefore, as the amplitude of the frequency-multiplexed signal is instantaneously increased, the corresponding spectrum width of the modulated signal is instantaneously increased.

Furthermore, in an output part of the demodulator 1409 in the first background art, part of the modulated signal components may remain together with the demodulated signal due to circuitry configuration. Such component is herein called a residual modulated signal. It is known that part of the frequency spectrum of the residual modulated signal causes deterioration in the quality of the demodulated signal, which is disclosed, for example, in "CNR characteristics of optical video transmission system using broadband FM modulation scheme", Fuse et al., Institute of Electronics, Information and Communication Engineers Papers, B-1, Vol. J81-B-1, No. 9, August, 1998.

FIG. 17 is a graph illustrating the relation between the residual modulated signal and the demodulated signal on a frequency axis. Similar to variations in the frequency spectrum width of the frequency-multiplexed signal, variations in the frequency spectrum width of the residual modulation signal correspond to variations in the amplitude of the frequency-multiplexed signal. Therefore, an instantaneous amplitude increase of the frequency-multiplexed signal causes an instantaneous increase in the spectrum width of the residual modulated signal, further interfering with the frequency band of the demodulated signal. As a result, the quality of the demodulated signal deteriorates instantaneously.

In addition to the above, such instantaneous amplitude increase in the frequency-multiplexed signal causes the following problems. That is, such instantaneous increase also causes an instantaneous increase in the corresponding spectrum width of the modulated signal. Then, the modulated signal with its instantaneous spectrum width increased is transmitted through a transmission path such as an optical fiber.

In general, the frequency band of the signal that can be transmitted with good quality through the transmission path is predetermined by design. Therefore, if the instantaneous spectrum width of the modulated signal to be transmitted increases over the predetermined bandwidth predetermined by design, the increased part is clipped or distorted. As a result, the quality of the demodulated signal deteriorates instantaneously.

On the other hand, the optical transmission system as described in the second background art in which the frequency-multiplexed signal is directly converted into an optical modulated signal for optical transmission, multichannel signal transmission using an optical fiber can be achieved with low cost.

However, also in the optical transmission system of the second background art, the following problems may occur due to the characteristics of the frequency-multiplexed signal, like the first background art.

The optical transmitter 1504 in the second background art generally uses a scheme called direct modulation. In the direct modulation scheme, a current injected to a light source such as a semiconductor laser is modulated with a modulating signal to be an optical intensity modulated signal.

FIG. 18 is a graph illustrating characteristics of input current to output optical intensity in the light source such as a laser device included in the optical transmitter. As shown in FIG. 18, when the input current falls down a threshold value (Ith), the output light power waveform is distorted with the part below the threshold value clipped. Therefore, if the frequency-multiplexed signal is used as the input current signal, its instantaneous increase in amplitude causes distortion in the waveform of the transmission signal, and therefore the quality thereof deteriorates instantaneously.

As described above, in the optical transmission systems as shown in the first and second background arts, an instantaneous amplitude increase, which characterizes the frequency-multiplexed signal, causes deterioration in the quality of the transmission signal.

SUMMARY OF THE INVENTION

Therefore, an object of the present invention is to provide an optical transmission system capable of achieving signal transmission with less distortion by suppressing an instantaneous amplitude increase of a frequency-multiplexed signal and preventing an instantaneous quality deterioration of a transmission signal.

A first aspect of the present invention is directed to a system for optically transmitting a frequency-multiplexed signal with a plurality of signals frequency-multiplexed, comprising: a detector, provided with the frequency-multiplexed signal, outputting a detection signal corresponding to an amplitude variation of the frequency-multiplexed signal; an amplitude controller adjusting an amplitude of the frequency-multiplexed signal by referring to the detection signal outputted from the detector, and outputting a suppressed multiplexed signal, which is the frequency-multiplexed signal with an instantaneous amplitude variation suppressed; a modulator modulating the suppressed multiplexed signal outputted from the amplitude controller to produce a predetermined modulated signal; a multiplexer multiplexing the modulated signal outputted from the modulator and the detection signal outputted from the detector to produce a multiplexed signal; an optical transmitter converting the multiplexed signal outputted from the multiplexer into an optical signal; an optical receiver converting the optical signal sent from the optical transmitter into an electrical signal; a separator separating the modulated signal and the detection signal from the electrical signal outputted from the optical receiver; a demodulator demodulating the modulated signal outputted from the separator to output the suppressed multiplexed signal; and an amplitude adjuster adjusting, by referring to the detection signal outputted from the separator, an amplitude of the suppressed multiplexed signal outputted from the demodulator to output the frequency-multiplexed signal corresponding to the frequency-multiplexed signal provided to the detector.

In general, when the frequency-multiplexed signal is modulated to be a predetermined modulated signal for optical transmission, the frequency spectrum of the modulated signal may be instantaneously increased as the instantaneous amplitude of the frequency-multiplexed signal increases. With this instantaneous increase in the modulated signal, the frequency spectrum of a residual modulated signal even after demodulation instantaneously interferes with the frequency-multiplexed signal after demodulation, thereby causes deterioration in signal quality.

Further, in the transmission path, the frequency band width of the signal that can be transmitted with good quality is generally predetermined by design. Therefore, if the instantaneous spectrum width of the optical modulated signal to be transmitted is increased over the predetermined bandwidth, the increased part is clipped or distorted.

Therefore, in the first aspect, the instantaneous amplitude of the frequency-multiplexed signal is detected, and is controlled, by referring to the detection signal, so as to become moderate. Then, the controlled signal is modulated to be a predetermined modulated signal such as angle-modulated signal for optical transmission. On the other hand, the detection signal is multiplexed with the modulated signal for optical transmission. In the receiving side, by referring to the detection signal, the amplitude of the frequency-multiplexed signal after demodulation is adjusted, and the frequency-multiplexed signal having the same instantaneous amplitude variation as that of the original frequency-multiplexed signal is reproduced. Thus, it is possible to prevent instantaneous quality deterioration of the transmission signal with the instantaneous amplitude variation of the frequency-multiplexed signal, and achieve modulation/demodulation and optical transmission with less distortion.

According to a second aspect, in the first aspect, the amplitude controller adjusts an instantaneous amplitude of the frequency-multiplexed signal to be held under a predetermined value.

In the second aspect, the instantaneous amplitude variation of the frequency-multiplexed signal is detected, and then controlled, by referring to the detection signal, so as to be under a predetermined value. Then, the detection signal is optically transmitted with the frequency-multiplexed signal. In the receiving side, the amplitude of the frequency-multiplexed signal is adjusted by referring to the detection signal, and the frequency-multiplexed signal having the same instantaneous amplitude variation as that of the original frequency-multiplexed signal is reproduced. It is thus possible to prevent instantaneous quality deterioration of the transmission signal due to the instantaneous amplitude variation of the frequency-multiplexed signal and achieve optical transmission with extremely less distortion.

A third aspect is directed to a system for optically transmitting a frequency-multiplexed signal with a plurality of signals frequency-multiplexed, comprising: a detector, provided with the frequency-multiplexed signal, outputting a detection signal corresponding to an amplitude variation of the frequency-multiplexed signal; an amplitude controller adjusting an amplitude of the frequency-multiplexed signal by referring to the detection signal outputted from the detector, and outputting a suppressed multiplexed signal, which is the frequency-multiplexed signal with an instantaneous amplitude variation suppressed; a modulator modulating the suppressed multiplexed signal outputted from the amplitude controller to produce a predetermined modulated signal; a detection signal modulator modulating the detection signal outputted from the detector to produce a modulated detection signal; a multiplexer multiplexing the modulated signal outputted from the modulator and the modulated detection signal outputted from the detection signal modulator to produce a multiplexed signal; an optical transmitter converting the multiplexed signal outputted from the multiplexer into an optical signal; an optical receiver converting the optical signal sent from the optical transmitter into an electrical signal; a separator separating the modulated signal and the modulated detection signal from the electrical signal outputted from the optical receiver; a demodulator demodulating the modulated signal outputted from the separator to output the suppressed multiplexed signal; a detection signal demodulator demodulating the modulated detection signal outputted from the separator to output the detection signal; and an amplitude adjuster adjusting, by referring to the detection signal outputted from the detection signal demodulator, an amplitude of the suppressed multiplexed signal outputted from the demodulator to output the frequency-multiplexed signal corresponding to the frequency-multiplexed signal provided to the detector.

In the third aspect, the instantaneous amplitude variation of the frequency-multiplexed signal is detected, and then controlled, by referring to the detection signal, so as to become moderate. The controlled signal is then modulated to be a predetermined modulated signal for optical transmission. On the other hand, the detection signal is moderated to be a second modulated signal (modulated detection signal), and multiplexed with the modulated signal. In the receiving side, by referring to the detection signal obtained by demodulating the second modulated signal, the amplitude of the frequency-multiplexed signal after optical transmission and demodulation is adjusted, and the frequency-multiplexed signal having the same instantaneous amplitude variation as that of the original frequency-multiplexed signal is reproduced. It is thus possible to prevent instantaneous quality deterioration of the transmission signal due to the instantaneous amplitude variation of the frequency-multiplexed signal and achieve more flexible modulation/demodulation and optical transmission with less distortion.

According to a fourth aspect, in the third aspect, the amplitude controller adjusts an instantaneous amplitude of the frequency-multiplexed signal to be held under a predetermined value.

According to a fifth aspect, in the third aspect, an entire or part of an occupied frequency band of the modulated detection signal outputted from the detection signal modulator is different from an occupied frequency band of the modulated signal multiplexed in the multiplexer.

In the fifth aspect, one or both of the carrier frequencies of the modulated signal and the modulated detection signal are set to appropriated values so as to avoid overlap between the occupied frequency bands of the modulated signal and the modulated detection signal. It is thus possible to prevent quality deterioration of a transmission signal due to interference between these two signals and achieve high-quality optical transmission.

A sixth aspect is directed to a system for optically transmitting a frequency-multiplexed signal with a plurality of signals frequency-multiplexed, comprising: a detector, provided with the frequency-multiplexed signal, outputting a detection signal corresponding to an amplitude variation of the frequency-multiplexed signal; a modulator, provided with the frequency-multiplexed signal and the detection signal, modulating the frequency-multiplexed signal with a carrier to produce a predetermined modulated signal and changing a predetermined parameter of the modulated signal by referring to the detection signal; an optical transmitter converting the modulated signal outputted from the modulator into an optical signal; an optical receiver converting the optical signal sent from the optical transmitter into an electrical signal; a demodulator demodulating the electrical signal outputted from the optical receiver to output the frequency-multiplexed signal.

In the sixth aspect, instantaneous amplitude variation of the frequency-multiplexed signal is detected. By referring to the detection signal, a predetermined parameter in the modulated signal is controlled and changed. Thus, instantaneous spectrum interference by residual modulated signal components due to instantaneous amplitude variation of the frequency-multiplexed signal can be prevented. It is thus possible to prevent instantaneous quality deterioration of a transmission signal and achieve modulation/demodulation and optical transmission with simple structure and less distortion.

According to a seventh aspect, in the sixth aspect, the predetermined parameter changed by the modulator is a carrier frequency of the modulated signal.

In the seventh aspect, the instantaneous amplitude variation of the frequency-multiplexed signal is detected. By referring to the detection signal, the carrier frequency of the modulated signal is controlled. Thus, instantaneous spectrum interference by residual modulated signal components due to instantaneous amplitude variation of the frequency-multiplexed signal can be prevented. It is thus possible to prevent instantaneous quality deterioration of a transmission signal and achieve modulation/demodulation and optical transmission with simple structure and less distortion.

According to an eighth aspect, in the seventh aspect, the modulator increases the carrier frequency of the modulated signal as an instantaneous amplitude of the frequency-multiplexed signal increases, and the modulator decreases the carrier frequency of the modulated signal as the instantaneous amplitude of the frequency-multiplexed signal decreases.

In the eighth aspect, the carrier frequency of the modulated signal is set higher as the instantaneous amplitude of the frequency-multiplexed signal increases. It is thus possible to eliminate interference from the frequency spectrum of the residual modulated signal with the demodulated signal and achieve high-quality optical transmission.

According to a ninth aspect, in the sixth aspect, the predetermined parameter changed by the modulator is frequency modulation efficiency of the modulated signal.

In the ninth aspect, the instantaneous amplitude variation of the frequency-multiplexed signal is detected. By referring to the detection signal, the frequency modulation efficiency of the modulated signal is controlled. Thus, instantaneous spectrum interference by residual modulated signal components due to instantaneous amplitude variation of the frequency-multiplexed signal can be prevented. It is thus possible to prevent instantaneous quality deterioration of a transmission signal and achieve modulation/demodulation and optical transmission with simple structure and less distortion.

According to a tenth aspect, in the ninth aspect, the modulator decreases the frequency modulation efficiency of the modulated signal as an instantaneous amplitude of the frequency-multiplexed signal increases, and the modulator increases the frequency modulation efficiency of the modulated signal as the instantaneous amplitude of the frequency-multiplexed signal decreases.

In the tenth aspect, the frequency modulation efficiency of the modulated signal is set be decreased as the instantaneous amplitude of the frequency-multiplexed signal increases. It is thus possible to eliminate interference from the frequency spectrum of the residual modulated signal with the demodulated signal and achieve high-quality optical transmission.

An eleventh aspect is directed to a system for optically transmitting a frequency-multiplexed signal with a plurality of signals frequency-multiplexed, comprising: a detector, provided with the frequency-multiplexed signal, outputting a detection signal corresponding to an amplitude variation of the frequency-multiplexed signal; an amplitude controller adjusting an amplitude of the frequency-multiplexed signal by referring to the detection signal outputted from the detector, and outputting a suppressed multiplexed signal, which is the frequency-multiplexed signal with an instantaneous amplitude variation suppressed; a multiplexer multiplexing the suppressed multiplexed signal outputted from the amplitude controller and the detection signal outputted from the detector to produce a multiplexed signal; a modulator modulating the multiplexed signal outputted from the multiplexer to produce a predetermined modulated signal; an optical transmitter converting the modulated signal outputted from the modulator into an optical signal; an optical receiver converting the optical signal sent from the optical transmitter into an electrical signal; a demodulator demodulating the electrical signal outputted from the optical receiver to produce a demodulated signal; a separator separating the suppressed multiplexed signal and the detection signal from the demodulated signal outputted from the demodulator; and an amplitude adjuster adjusting, by referring to the detection signal outputted from the separator, an amplitude of the suppressed multiplexed signal outputted from the separator to output the frequency-multiplexed signal corresponding to the frequency-multiplexed signal provided to the detector.

In the eleventh aspect, the instantaneous amplitude variation of the frequency-multiplexed signal is detected, and then controlled, by referring to the detection signal, so as to become moderate. The detection signal is then multiplexed with the frequency-multiplexed signal, and then modulated to be a predetermined modulated signal for optical transmission. In the receiving side, a signal obtained by multiplexing the frequency-multiplexed signal and the detection signal is demodulated. By referring to the demodulated detection signal, the amplitude of the frequency-multiplexed signal is adjusted to reproduce the frequency-multiplexed signal having the same instantaneous amplitude variation as that of the original frequency-multiplexed signal. It is thus possible to prevent instantaneous quality deterioration of a transmission signal due to the instantaneous amplitude variation of the frequency-multiplexed signal and achieve modulation/demodulation and optical transmission with extremely less distortion.

According to a twelfth aspect, in the eleventh aspect, the amplitude controller adjusts an instantaneous amplitude of the frequency-multiplexed signal to be held under a predetermined value.

A thirteenth aspect is directed to a system for optically transmitting a frequency-multiplexed signal with a plurality of signals frequency-multiplexed, comprising: a detector, provided with the frequency-multiplexed signal, outputting a detection signal corresponding to an amplitude variation of the frequency-multiplexed signal; an amplitude controller adjusting an amplitude of the frequency-multiplexed signal by referring to the detection signal outputted from the detector, and outputting a suppressed multiplexed signal, which is the frequency-multiplexed signal with an instantaneous amplitude variation suppressed; a phase adjuster adjusting a phase of the detection signal outputted from the detector to produce a phase-adjusted detection signal; a multiplexer multiplexing the suppressed multiplexed signal outputted from the amplitude controller and the phase-adjusted detection signal outputted from the phase adjuster to produce a multiplexed signal; a modulator modulating the multiplexed signal outputted from the multiplexer to produce a predetermined modulated signal; an optical transmitter converting the modulated signal outputted from the modulator into an optical signal; an optical receiver converting the optical signal sent from the optical transmitter into an electrical signal; a demodulator demodulating the electrical signal outputted from the optical receiver; a separator separating the suppressed multiplexed signal and the phase-adjusted detection signal from the electrical signal outputted from the demodulator; a phase reproducer adjusting a phase of the phase-adjusted detection signal outputted the separator to output the detection signal before the phase thereof is adjusted; and an amplitude adjuster adjusting, by referring to the detection signal outputted from the phase reproducer, an amplitude of the suppressed multiplexed signal outputted from the separator to output the frequency-multiplexed signal corresponding to the frequency-multiplexed signal provided to the detector.

In the thirteenth aspect, the instantaneous amplitude variation of the frequency-multiplexed signal is detected, and then controlled, by referring to the detection signal, so as to become moderate. The phase-adjusted detection signal is then multiplexed with the frequency-multiplexed signal, and then modulated to be a predetermined modulated signal for optical transmission. In the receiving side, a signal obtained by multiplexing the frequency-multiplexed signal and the phase-adjusted detection signal is demodulated. By referring to the phase-reproduced detection signal, the amplitude of the frequency-multiplexed signal is adjusted to reproduce the frequency-multiplexed signal having the same instantaneous amplitude variation as that of the original frequency-multiplexed signal. It is thus possible to prevent instantaneous quality deterioration of a transmission signal due to the instantaneous amplitude variation of the frequency-multiplexed signal and achieve modulation/demodulation and optical transmission with less distortion.

According to a fourteenth aspect, in the thirteenth aspect, the amplitude controller adjusts an instantaneous amplitude of the frequency-multiplexed signal to be held under a predetermined value.

According to a fifteenth aspect, in the thirteenth aspect, the phase adjuster adjusts the phase of the detection signal so that instantaneous amplitude variations of the suppressed multiplexed signal and the detection signal multiplexed in the multiplexer are opposite in polarity.

In the fifteenth aspect, the phase of the detection signal is adjusted so that the instantaneous amplitude variations of the frequency-multiplexed signal and the detection signal multiplexed in the multiplexer are opposite in polarity. That is, the phase of the detection signal is adjusted so that the instantaneous amplitude of the detection signal is decreased as that of the frequency-multiplexed signal increases, and vice versa. After such adjustment, the detection signal is optically transmitted with the frequency-multiplexed signal. The instantaneous amplitude variation of the optical transmission signal is thus suppressed, and optical transmission with less distortion can be achieved.

A sixteenth aspect is directed to a system for optically transmitting a frequency-multiplexed signal with a plurality of signals frequency-multiplexed, comprising: a detector, provided with the frequency-multiplexed signal, outputting a detection signal corresponding to an amplitude variation of the frequency-multiplexed signal; an amplitude controller adjusting an amplitude of the frequency-multiplexed signal by referring to the detection signal outputted from the detector, and outputting a suppressed multiplexed signal, which is the frequency-multiplexed signal with an instantaneous amplitude variation suppressed; a detection signal modulator modulating the detection signal outputted from the detector to produce a modulated detection signal; a multiplexer multiplexing the suppressed multiplexed signal outputted from the amplitude controller and the modulated detection signal outputted from the detection signal modulator to produce a multiplexed signal; a modulator modulating the multiplexed signal outputted from the multiplexer to produce a predetermined modulated signal; an optical transmitter converting the modulated signal outputted from the modulator into an optical signal; an optical receiver converting the optical signal sent from the optical transmitter into an electrical signal; a demodulator demodulating the electrical signal outputted from the optical receiver to produce a demodulated signal; a separator separating the suppressed multiplexed signal and the modulated detection signal from the demodulated signal outputted from the demodulator; a detection signal demodulator demodulating the modulated detection signal outputted from the separator to output the detection signal; an amplitude adjuster adjusting, by referring to the detection signal outputted from the detection signal demodulator, an amplitude of the suppressed multiplexed signal outputted from the separator to output the frequency-multiplexed signal corresponding to the frequency-multiplexed signal provided to the detector.

In the sixteenth aspect, the instantaneous amplitude variation of the frequency-multiplexed signal is detected, and then controlled, by referring to the detection signal, so as to become moderate. The detection signal is then modulated to be a second modulated signal (modulated detection signal). The second modulated signal is multiplexed with the frequency-multiplexed signal, and then modulated into a predetermined modulated signal for optical transmission. In the receiving side, a signal obtained by multiplexing the frequency-multiplexed signal and the modulated detection signal is demodulated. By referring to the detection signal obtained by demodulating the modulated detection signal, the amplitude of the frequency-multiplexed signal is adjusted to reproduce the frequency-multiplexed signal having the same instantaneous amplitude variation as that of the original frequency-multiplexed signal. It is thus possible to prevent instantaneous quality deterioration of a transmission signal due to the instantaneous amplitude variation of the frequency-multiplexed signal and achieve modulation/demodulation and optical transmission with more flexibility and less distortion.

According to a seventeenth aspect, in the sixteenth aspect, the amplitude controller adjusts an instantaneous amplitude of the frequency-multiplexed signal to be held under a predetermined value.

According to an eighteenth aspect, in the sixteenth aspect, an entire or part of an occupied frequency band of the modulated detection signal outputted from the detection signal modulator is different from an occupied frequency band of the suppressed multiplexed signal obtained in the multiplexer.

In the eighteenth aspect, one or both of the carrier frequencies of the frequency-multiplexed signal and the modulated detection signal are set to appropriated values so as to avoid overlap between the occupied frequency bands of the frequency-multiplexed signal and the modulated detection signal. It is thus possible to prevent quality deterioration of a transmission signal due to interference between these two signals and achieve high-quality optical transmission A nineteenth aspect is directed to a system for optically transmitting a frequency-multiplexed signal with a plurality of signals frequency-multiplexed, comprising: a detector, provided with the frequency-multiplexed signal, outputting a detection signal corresponding to an amplitude variation of the frequency-multiplexed signal; an amplitude controller adjusting an amplitude of the frequency-multiplexed signal by referring to the detection signal outputted from the detector, and outputting a suppressed multiplexed signal, which is the frequency-multiplexed signal with an instantaneous amplitude variation suppressed; a phase adjuster adjusting a phase of the detection signal outputted from the detector to produce a phase-adjusted detection signal; a detection signal modulator modulating the phase-adjusted detection signal outputted from the phase adjuster to produce a modulated detection signal; a multiplexer multiplexing the suppressed multiplexed signal outputted from the amplitude controller and the modulated detection signal outputted from the detection signal modulator to produce a multiplexed signal; a modulator modulating the multiplexed signal to produce a predetermined modulated signal; an optical transmitter converting the modulated signal outputted from the modulator into an optical signal; an optical receiver converting the optical signal sent from the optical transmitter into an electrical signal; a demodulator demodulating the electrical signal outputted from the optical receiver to produce a demodulated signal; a separator separating the suppressed multiplexed signal and the modulated detection signal from the demodulated signal outputted from the demodulator; a detection signal demodulator demodulating the modulated detection signal outputted from the separator to output the phase-adjusted detection signal before modulation; a phase reproducer adjusting a phase of the phase-adjusted detection signal outputted from the detection signal demodulator to output the detection signal before phase adjustment; and an amplitude adjuster adjusting, by referring to the detection signal outputted from the phase reproducer, an amplitude of the suppressed multiplexed signal outputted from the separator to output the frequency-multiplexed signal corresponding to the frequency-multiplexed signal provided to the detector.

In the nineteenth aspect, the instantaneous amplitude variation of the frequency-multiplexed signal is detected, and then controlled, by referring to the detection signal, so as to become moderate. The phase-adjusted detection signal is then modulated to be a second modulated signal (modulated detection signal). The second modulated signal is multiplexed with the frequency-multiplexed signal, and then modulated into a predetermined modulated signal for optical transmission. In the receiving side, a signal obtained by multiplexing the frequency-multiplexed signal and the detection signal is demodulated. By referring to the detection signal obtained by demodulating the modulated detection signal and then adjusting the phase thereof, the amplitude of the frequency-multiplexed signal is adjusted to reproduce the frequency-multiplexed signal having the same instantaneous amplitude variation as that of the original frequency-multiplexed signal. It is thus possible to prevent instantaneous quality deterioration of a transmission signal due to the instantaneous amplitude variation of the frequency-multiplexed signal and achieve modulation/demodulation and optical transmission with more flexibility and less distortion.

According to a twentieth aspect, in the nineteenth aspect, the amplitude controller adjusts an instantaneous amplitude of the frequency-multiplexed signal to be held under a predetermined value.

According to a twenty-first aspect, in the nineteenth aspect, an entire or part of an occupied frequency band of the modulated detection signal outputted from the detection signal modulator is different from an occupied frequency band of the suppressed multiplexed signal obtained in the multiplexer.

According to a twenty-second aspect, in the nineteenth aspect, the phase adjuster adjusts the phase of the detection signal so that instantaneous amplitude variations of the suppressed multiplexed signal and the modulated detection signal multiplexed in the multiplexer are opposite in polarity.

A twenty-third aspect is directed to a system for optically transmitting a frequency-multiplexed signal with a plurality of signals frequency-multiplexed, comprising: a detector, provided with the frequency-multiplexed signal, outputting a detection signal corresponding to an amplitude variation of the frequency-multiplexed signal; an amplitude controller adjusting an amplitude of the frequency-multiplexed signal by referring to the detection signal outputted from the detector, and outputting a suppressed multiplexed signal, which is the frequency-multiplexed signal with an instantaneous amplitude variation suppressed; a multiplexer multiplexing the suppressed multiplexed signal outputted from the amplitude controller and the detection signal outputted from the detector to produce a multiplexed signal; an optical transmitter converting the multiplexed signal outputted from the multiplexer into an optical signal; an optical receiver converting the optical signal sent from the optical transmitter into an electrical signal; a separator separating the suppressed multiplexed signal and the detection signal from the electrical signal outputted from the optical receiver; and an amplitude adjuster adjusting, by referring to the detection signal outputted from the separator, an amplitude of the suppressed multiplexed signal outputted from the separator to output the frequency-multiplexed signal corresponding to the frequency-multiplexed signal provided to the detector.

In general, when the frequency-multiplexed signal is modulated to be a predetermined modulated signal for optical transmission, clipping occurs at a threshold in input-current-to output-optical-intensity characteristics of a laser due to the instantaneous amplitude increase of the frequency-multiplexed signal. Waveform distortion due to such clipping produces deterioration in transmission signal quality.

Therefore, in the twenty-third aspect, the instantaneous amplitude of the frequency-multiplexed signal is detected, and is controlled, by referring to the detection signal, so as to become moderate. Then, the detection signal is multiplexed with the frequency-multiplexed signal, and then modulated to be a predetermined optical modulated signal for optical transmission. In the receiving side, by referring to the detection signal, the amplitude of the frequency-multiplexed signal after optical transmission is adjusted, and the frequency-multiplexed signal having the same instantaneous amplitude variation as that of the original frequency-multiplexed signal is reproduced. Thus, it is possible to prevent instantaneous quality deterioration of the transmission signal with the instantaneous amplitude variation of the frequency-multiplexed signal, and achieve modulation/demodulation and optical transmission with less distortion.

According to a twenty-fourth aspect, in the twenty-third aspect, the amplitude controller adjusts an instantaneous amplitude of the frequency-multiplexed signal to be held under a predetermined value.

A twenty-fifth aspect is directed to a system for optically transmitting a frequency-multiplexed signal with a plurality of signals frequency-multiplexed, comprising: a detector, provided with the frequency-multiplexed signal, outputting a detection signal corresponding to an amplitude variation of the frequency-multiplexed signal; an amplitude controller adjusting an amplitude of the frequency-multiplexed signal by referring to the detection signal outputted from the detector, and outputting a suppressed multiplexed signal, which is the frequency-multiplexed signal with an instantaneous amplitude variation suppressed; a phase adjuster adjusting a phase of the detection signal outputted from the detector to produce a phase-adjusted detection signal; a multiplexer multiplexing the suppressed multiplexed signal outputted from the amplitude controller and the phase-adjusted detection signal outputted from the phase adjuster to produce a multiplexed signal; an optical transmitter converting the multiplexed signal outputted from the multiplexer into an optical signal; an optical receiver converting the optical signal sent from the optical transmitter into an electrical signal; a separator separating the suppressed multiplexed signal and the phase-adjusted detection signal from the electrical signal outputted from the optical receiver; a phase reproducer adjusting a phase of the phase-adjusted detection signal outputted from the separator to output the detection signal before phase adjustment; and an amplitude adjuster adjusting, by referring to the detection signal outputted from the phase reproducer, an amplitude of the suppressed multiplexed signal outputted from the separator to output the frequency-multiplexed signal corresponding to the frequency-multiplexed signal provided to the detector.

In the twenty-fifth aspect, the instantaneous amplitude variation of the frequency-multiplexed signal is detected, and then controlled, by referring to the detection signal, so as to be under a predetermined value. Then, the phase-adjusted detection signal is multiplexed with the frequency-multiplexed signal, and modulated to be an optical modulated signal for optical transmission. In the receiving side, the amplitude of the frequency-multiplexed signal after optical transmission is adjusted by referring to the phase-reproduced detection signal, and the frequency-multiplexed signal having the same instantaneous amplitude variation as that of the original frequency-multiplexed signal is reproduced. It is thus possible to prevent instantaneous quality deterioration of the transmission signal due to the instantaneous amplitude variation of the frequency-multiplexed signal and achieve optical transmission with less distortion.

According to a twenty-sixth aspect, in the twenty-fifth aspect, the amplitude controller adjusts an instantaneous amplitude of the frequency-multiplexed signal to be held under a predetermined value.

According to a twenty-seventh aspect, in the twenty-fifth aspect, the phase adjuster adjusts the phase of the detection signal so that instantaneous amplitude variations of the suppressed multiplexed signal and the detection signal multiplexed in the multiplexer are opposite in polarity.

In the twenty-seventh aspect, the phase of the detection signal is adjusted so that the instantaneous amplitude variations of the frequency-multiplexed signal and the detection signal multiplexed in the multiplexer are opposite in polarity. That is, the phase of the detection signal is adjusted so that the instantaneous amplitude of the detection signal is decreased as that of the frequency-multiplexed signal increases, and vice versa. After such adjustment, the detection signal is optically transmitted with the frequency-multiplexed signal. The instantaneous amplitude variation of the optical transmission signal is thus suppressed, and optical transmission with less distortion can be achieved.

A twenty-eighth aspect is directed to a system for optically transmitting a frequency-multiplexed signal with a plurality of signals frequency-multiplexed, comprising: a detector, provided with the frequency-multiplexed signal, outputting a detection signal corresponding to an amplitude variation of the frequency-multiplexed signal; an amplitude controller adjusting an amplitude of the frequency-multiplexed signal by referring to the detection signal outputted from the detector, and outputting a suppressed multiplexed signal, which is the frequency-multiplexed signal with an instantaneous amplitude variation suppressed; a detection signal modulator modulating the detection signal outputted from the detector to produce a modulated detection signal; a multiplexer multiplexing the suppressed multiplexed signal outputted from the amplitude controller and the modulated detection signal outputted from the detection signal modulator to produce a multiplexed signal; an optical transmitter converting the multiplexed signal outputted from the multiplexer into an optical signal; an optical receiver converting the optical signal sent from the optical transmitter into an electrical signal; a separator separating the suppressed multiplexed signal and the modulated detection signal from the electrical signal outputted from the optical receiver; a detection signal demodulator demodulating the modulated detection signal outputted from the separator to output the detection signal; and an amplitude adjuster adjusting, by referring to the detection signal outputted from the detection signal demodulator, an amplitude of the suppressed multiplexed signal outputted from the separator to output the frequency-multiplexed signal corresponding to the frequency-multiplexed signal provided to the detector.

In the twenty-eighth aspect, the instantaneous amplitude of the frequency-multiplexed signal is detected, and is controlled, by referring to the detection signal, so as to become moderate. Then, the detection signal is modulated to be a second modulated signal (modulated detection signal), and then multiplexed with the frequency-multiplexed signal for optical transmission. In the receiving side, by referring to the detection signal obtained by demodulating the second modulated signal, the amplitude of the frequency-multiplexed signal is adjusted, and the frequency-multiplexed signal having the same instantaneous amplitude variation as that of the original frequency-multiplexed signal is reproduced. Thus, it is possible to prevent instantaneous quality deterioration of the transmission signal with the instantaneous amplitude variation of the frequency-multiplexed signal, and achieve modulation/demodulation and optical transmission with more flexibility and less distortion.

According to a twenty-ninth aspect, in the twenty-eighth aspect, the amplitude controller adjusts an instantaneous amplitude of the frequency-multiplexed signal to be held under a predetermined value.

According to a thirtieth aspect, in the twenty-eighth aspect, an entire or part of an occupied frequency band of the modulated detection signal outputted from the detection signal modulator is different from an occupied frequency band of the suppressed multiplexed signal obtained in the multiplexer.

A thirty-first aspect is directed to a system for optically transmitting a frequency-multiplexed signal with a plurality of signals frequency-multiplexed, comprising: a detector, provided with the frequency-multiplexed signal, outputting a detection signal corresponding to an amplitude variation of the frequency-multiplexed signal; an amplitude controller adjusting an amplitude of the frequency-multiplexed signal by referring to the detection signal outputted from the detector, and outputting a suppressed multiplexed signal, which is the frequency-multiplexed signal with an instantaneous amplitude variation suppressed; a phase adjuster adjusting a phase of the detection signal outputted from the detector to produce a phase-adjusted detection signal; a detection signal modulator modulating the phase-adjusted detection signal outputted from the phase adjuster to produce a modulated detection signal; a multiplexer multiplexing the suppressed multiplexed signal outputted from the amplitude controller and the modulated detection signal outputted from the detection signal modulator to produce a multiplexed signal; an optical transmitter converting the multiplexed signal outputted from the multiplexer into an optical signal; an optical receiver converting the optical signal sent from the optical transmitter into an electrical signal; a separator separating the suppressed multiplexed signal and the modulated detection signal from the electrical signal outputted from the optical receiver; a detection signal demodulator demodulating the modulated detection signal outputted from the separator to output the phase-adjusted detection signal; a phase reproducer adjusting a phase of the phase-adjusted detection signal outputted the detection signal demodulator to output the detection signal before phase adjustment; and an amplitude adjuster adjusting, by referring to the detection signal outputted from the phase reproducer, an amplitude of the suppressed multiplexed signal outputted from the separator to output the frequency-multiplexed signal corresponding to the frequency-multiplexed signal provided to the detector.

In the thirty-first aspect, the instantaneous amplitude of the frequency-multiplexed signal is detected, and is controlled, by referring to the detection signal, so as to become moderate. Then, the phase-adjusted detection signal is modulated to be a second modulated signal (modulated detection signal), multiplexed with the frequency-multiplexed signal, and then modulated to be an optical modulated signal for optical transmission. In the receiving side, by referring to the detection signal obtained by demodulating the modulated detection signal and reproducing the phase thereof, the amplitude of the frequency-multiplexed signal is adjusted, and the frequency-multiplexed signal having the same instantaneous amplitude variation as that of the original frequency-multiplexed signal is reproduced. Thus, it is possible to prevent instantaneous quality deterioration of the transmission signal with the instantaneous amplitude variation of the frequency-multiplexed signal, and achieve modulation/demodulation and optical transmission with more flexibility and less distortion.

According to a thirty-second aspect, in the thirty-first aspect, the amplitude controller adjusts an instantaneous amplitude of the frequency-multiplexed signal to be held under a predetermined value.

According to a thirty-third aspect, in the thirty-first aspect, an entire or part of an occupied frequency band of the modulated detection signal outputted from the detection signal modulator is different from an occupied frequency band of the suppressed multiplexed signal obtained in the multiplexer.

According to a thirty-fourth aspect, in the thirty-first aspect, the phase adjuster adjusts the phase of the detection signal so that instantaneous amplitude variations of the suppressed multiplexed signal and the modulated detection signal multiplexed in the multiplexer are opposite in polarity.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
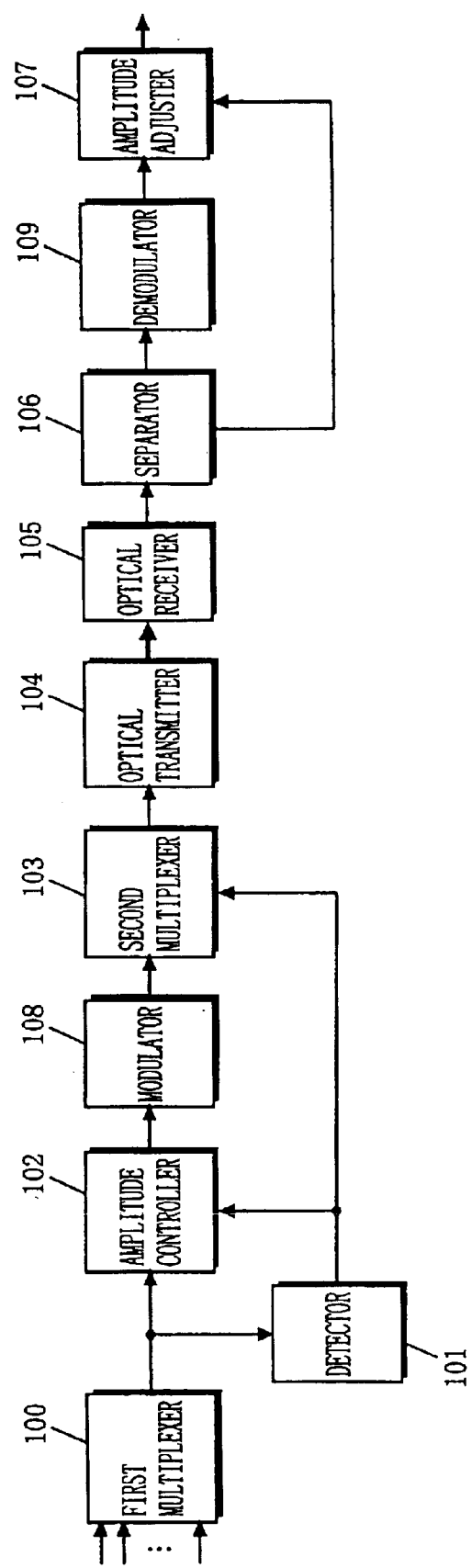
FIG. 1 is a block diagram showing the configuration of an optical transmission system according to a first embodiment of the present invention.

FIG. 1 is a block diagram showing an optical transmission system for a frequency-multiplexed signal according to a first embodiment of the present invention. In FIG. 1, the optical transmission system includes a first multiplexer 100 to which a plurality of signals having different carrier frequencies are supplied; a detector 101 to which a signal outputted from the first multiplexer 100 is supplied; an amplitude controller 102 to which the signal from the first multiplexer 100 and a signal outputted from the detector 101 are supplied; a modulator 108 to which a signal outputted from the amplitude controller 102 is supplied; a second multiplexer 103 to which a signal outputted from the modulator 108 and the signal from the detector 101 are supplied; an optical transmitter 104 to which a signal outputted from the second multiplexer 103 is supplied; an optical receiver 105 receiving an optical signal sent from the optical transmitter 104; a separator 106 to which a signal outputted from the optical receiver 105 is supplied; a demodulator 109 to which a signal outputted from the separator 106 is supplied; and an amplitude adjuster 107 to which a signal outputted from the demodulator 109 and the signal from the separator 106 are supplied.

Next, the operation of the optical transmission system according to the first embodiment shown in FIG. 1 is described. The first multiplexer 100 is supplied with a plurality of signals having predetermined different carrier frequencies from each other, and multiplexes these signals to produce a frequency-multiplexed signal.

The detector 101 detects the amount of variation in the instantaneous amplitude of the frequency-multiplexed signal outputted from the first multiplexer 100. With a known comparator, for example, the magnitude of each instantaneous amplitude of the frequency-multiplexed signal is compared with a predetermined value for detection. As a result of comparison, the detector 101 detects a difference therebetween. The detection result is sequentially produced as a detection signal.

The amplitude controller 102 is implemented as a variable gain amplifier, for example. The amplitude controller 102 controls the amplitude of the frequency-multiplexed signal supplied by the first multiplexer 100 by referring to the detection signal. More specifically, the amplitude controller 102 decreases the gain of the amplifier when the instantaneous amplitude is large, while increasing when small. It is thus possible to control the instantaneous amplitude variation of the frequency-multiplexed signal to become moderate and, more ideally, under a predetermined value. The frequency-multiplexed signal with its instantaneous amplitude controlled in the above described manner is provided to the modulator 108.

The modulator 108 modulates the frequency-multiplexed signal (with its instantaneous amplitude controlled) supplied by the amplitude controller 102 to produce a predetermined modulated signal such as a frequency modulated (FM) signal and phase modulated (PM) signal.

Figure 2:
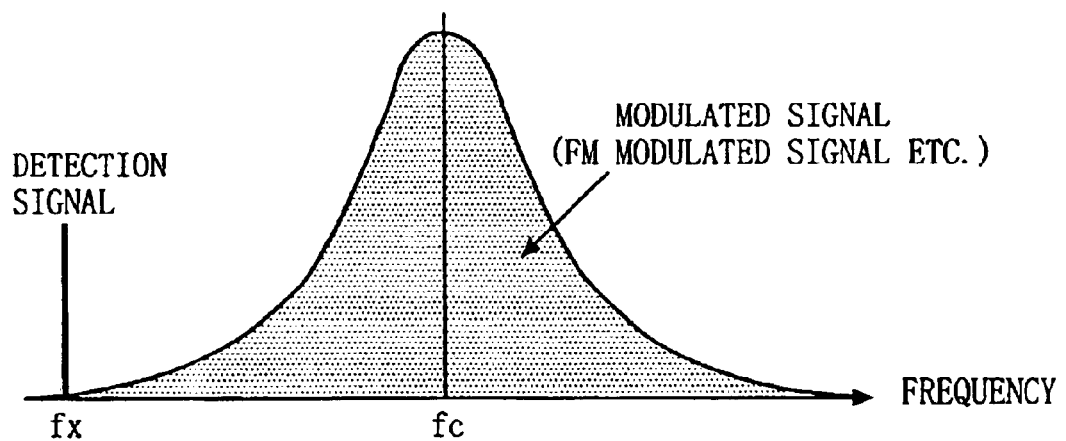
FIG. 2 is a graph showing one example of frequency distribution when a detection signal and a modulated signal are multiplexed in a second multiplexer of FIG. 1.

The second multiplexer 103 multiplexes (more specifically, frequency-multiplexes) the modulated signal outputted from the modulator 108 and the detection signal outputted from the detector 101. FIG. 2 is a graph showing one example of the relation between the modulated signal and the detection signal multiplexed on a frequency axis. As shown in FIG. 2, the modulated signal and the detection signal are frequency-multiplexed, and a center frequency fc of the modulated signal is different from a frequency fx of the detection signal.

The optical transmitter 104 converts the electrical signal outputted from the second multiplexer 103 into an optical modulated signal. Then, the optical modulated signal is sent to an optical transmission path (not shown), by way of example only, with one end thereof connected to the optical transmitter 104.

The optical receiver 105 is connected to the other end of the optical transmission path. The optical receiver 105 receives the optical modulated signal transmitted through the optical transmission path, and converts the optical modulated signal into an electrical signal. The separator 106 receives the electrical signal from the optical receiver 105, and separates, from the electrical signal, the modulated signal equivalent to that from the modulator 108 and the detection signal equivalent to that from the detector 101. The demodulator 109 demodulates the modulated signal outputted from the separator 106 to reproduce the frequency-multiplexed signal equivalent to that outputted from the amplitude controller 102.

Similar to the amplitude controller 102, the amplitude adjuster 107 is implemented as, by way of example only, a variable gain amplifier. The amplitude adjuster 107 adjusts the controlled instantaneous amplitude of the frequency-multiplexed signal outputted from the demodulator 109. More specifically, by referring to the detection signal outputted from the separator 106, the amplitude adjuster 107 increases or decreases the gain of the amplifier so that the controlled instantaneous amplitude of the frequency-multiplexed signal recovers to the instantaneous amplitude thereof before control. Thus, the amplitude adjuster 107 can output the frequency-multiplexed signal with instantaneous amplitude variations similar or ideally equal to those of the frequency-multiplexed signal outputted from the first multiplexer 100.

As described above, in the optical transmission system of FIG. 1, the frequency-multiplexed signal is converted with its instantaneous amplitude variation components suppressed to be a modulated signal such as an FM modulated signal. The modulated signal is optically transmitted, demodulated, and provided with the instantaneous amplitude variation components to reproduce the original frequency-multiplexed signal. It is thus possible to ease instantaneous variations in the frequency spectrum width of the modulated signal outputted from the modulator 108. Therefore, it is also possible at demodulation to ease instantaneous variations in the frequency spectrum width of the residual modulated signal components included in the output signal from the demodulator 109. Thus, instantaneous interference of the residual modulated signal with the demodulated signal can be suppressed. Moreover, since the instantaneous frequency spectrum width of the modulated signal to be transmitted through the optical transmission path does not increase over the bandwidth predetermined by design, clipping of the frequency spectrum or distortion of the demodulated signal does not occur. Therefore, the optical transmission system of FIG. 1 can realize signal transmission with good linearity and less distortion.

(Second Embodiment)

Figure 3:
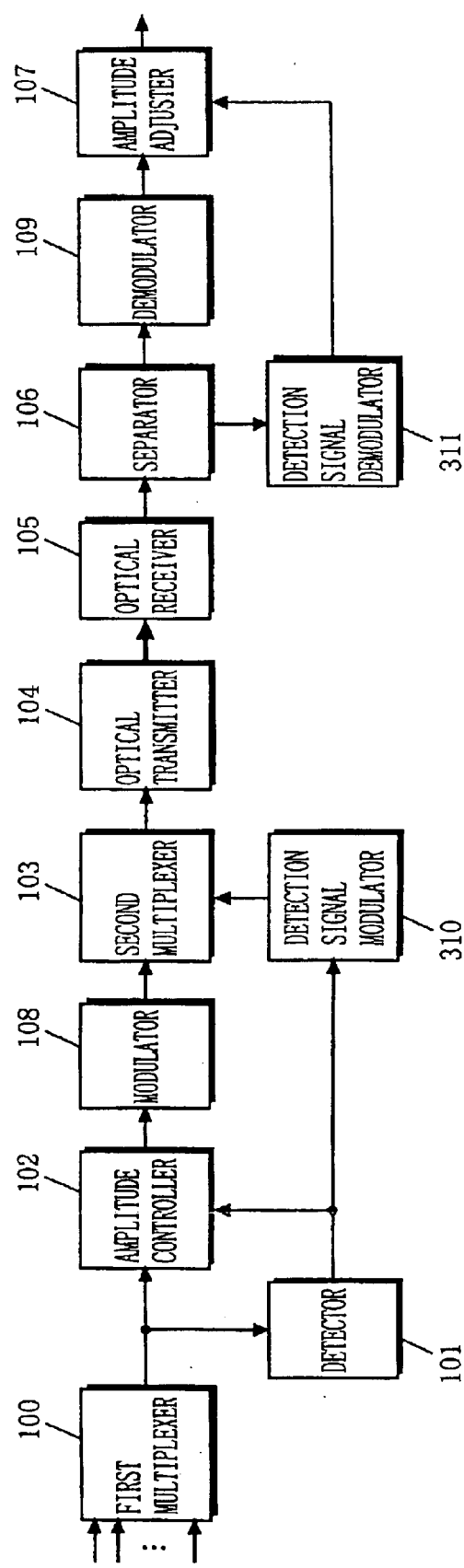
FIG. 3 is a block diagram showing the configuration of an optical transmission system according to a second embodiment of the present invention.

FIG. 3 is a block diagram showing an optical transmission system for a frequency-multiplexed signal according to a second embodiment of the present invention. In FIG. 3, the optical transmission system includes the first multiplexer 100 to which a plurality of signals having different carrier frequencies are supplied; the detector 101 to which a signal outputted from the first multiplexer 100 is supplied; the amplitude controller 102 to which the signal from the first multiplexer 100 and a signal outputted from the detector 101 are supplied; the modulator 108 to which a signal outputted from the amplitude controller 102 is supplied; a detection signal modulator 310 to which the signal from the detector 101 is supplied; the second multiplexer 103 to which a signal outputted from the modulator 108 and a signal from the detection signal modulator 310 are supplied; the optical transmitter 104 to which a signal outputted from the second multiplexer 103 is supplied; the optical receiver 105 receiving an optical signal sent from the optical transmitter 104; the separator 106 to which a signal outputted from the optical receiver 105 is supplied; the demodulator 109 to which a signal outputted from the separator 106 is supplied; a detection signal demodulator 311 to which the signal from the separator 106 is supplied; and the amplitude adjuster 107 to which a signal outputted from the demodulator 109 and a signal from the detection signal demodulator 311 are supplied.

The second embodiment is different from the first embodiment in that the detection signal modulator 310 and the detection signal demodulator 311 are newly provided. The other components having the same functions as those in the first embodiment are provided with the same reference numerals, and their description is simplified herein. Mainly described below is the difference from the first embodiment.

In the above first embodiment, the detection signal outputted from the detector 101 is not modulated but directly is multiplexed with the modulated signal outputted from the modulator 108. However, in the second embodiment, the detection signal outputted from the detector 101 is modulated by the detection signal modulator 310 to be a modulated detection signal having a predetermined carrier frequency. Then, the second multiplexer 103 multiplexes the modulated signal and the modulated detection signal to produce a multiplexed signal. This multiplexed signal is converted into an optical signal by the optical transmitter 104 for transmission, as in the first embodiment.

The optical receiver 105 receives the transmitted optical signal, and converts the same into an electrical signal. The separator 106 separates the modulated detection signal and the modulated signal from the received electrical signal. The detection signal demodulator 311 demodulates the modulated detection signal to produce the detection signal, and supplies the same to the amplitude adjuster 107. The amplitude adjuster 107 reproduces the instantaneous amplitude of the frequency-multiplexed signal using the demodulated detection signal, as in the first embodiment.

As described above, in the optical transmission system of FIG. 3, the detection signal is modulated to be a modulated detection signal having a predetermined carrier frequency, and then multiplexed with the modulated signal obtained by modulating the original frequency-multiplexed signal. It is therefore possible to distribute the detection signal in an optimal frequency band that is an arbitrary frequency apart from the center frequency of the modulated signal.

For example, in FIG. 2, the frequency fx of the detection signal is multiplexed at a frequency apart from the center frequency fc of the modulated signal in order to avoid interference by the modulated signal components. On the other hand, if the detection signal is modulated using a predetermined carrier frequency, the frequency fx can be arbitrarily selected. Therefore, it is possible to optimally set frequency distribution of the detection signal and the modulated signal with more flexibility. With this setting, interference of the residual modulated signal components with the demodulated signal can be suppressed effectively. Therefore, the optical transmission system of FIG. 3 can achieve signal transmission with less distortion.

(Third Embodiment)

Figure 4:
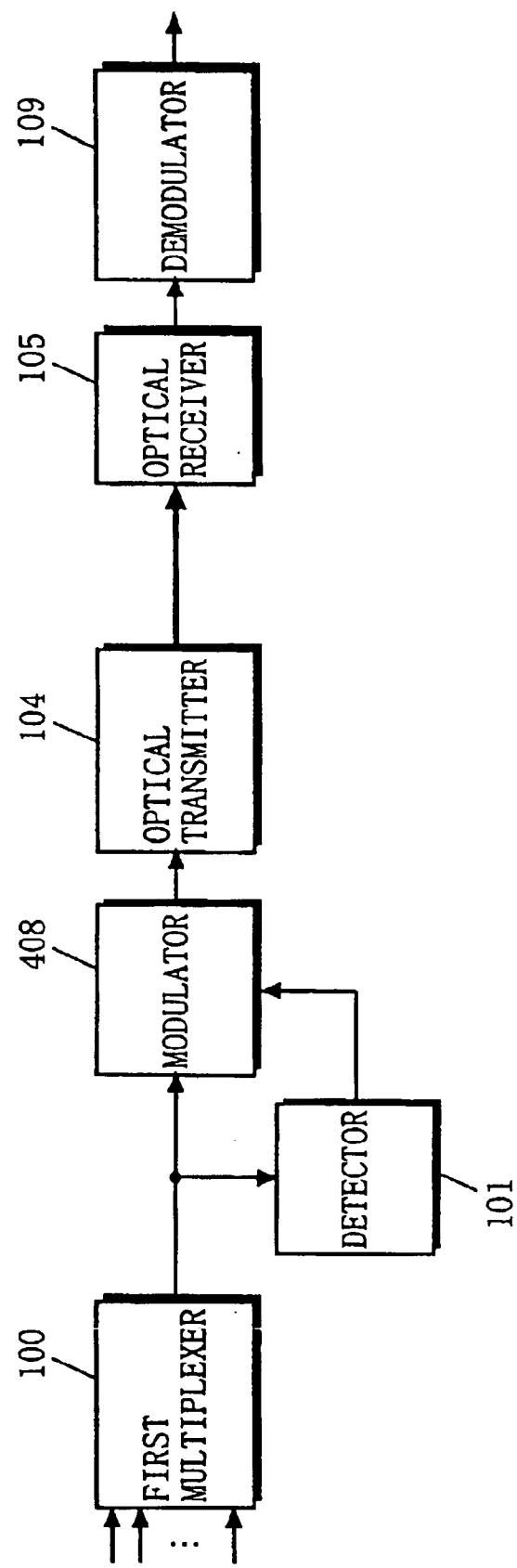
FIG. 4 is a block diagram showing the configuration of an optical transmission system according to a third embodiment of the present invention.

FIG. 4 is a block diagram showing an optical transmission system for a frequency-multiplexed signal according to a third embodiment of the present invention. In FIG. 4, the optical transmission system includes the first multiplexer 100 to which a plurality of signals having different carrier frequencies are supplied; the detector 101 to which a signal outputted from the first multiplexer 100 is supplied; a modulator 408 to which the signal from the first multiplexer 100 and a signal outputted from the detector 101 are supplied; the optical transmitter 104 to which a signal outputted from the modulator 408 is supplied; the optical receiver 105 to which an optical signal outputted from the optical transmitter 104 is supplied; and the demodulator 109 to which a signal outputted from the optical transmitter 105 is supplied.

The third embodiment is different from the first embodiment in that the amplitude controller 102, the second multiplexer 103, the separator 106, and the amplitude adjuster 107 are not provided and that the detection signal from the detector 101 is supplied to the modulator 408. The other components having the same functions as those in the first embodiment are provided with the same reference numerals, and their description is simplified herein. Mainly described below is the difference from the first embodiment.

In the above first embodiment, the detection signal from the detector 101 is used as a control signal for controlling an instantaneous amplitude of the frequency-multiplexed signal, and multiplexed for transmission.

However, in the third embodiment, as a first method, the modulator 408 controls, by using the detection signal from the detector 101, the carrier frequency of the modulated signal to be produced therein. In this control, the carrier frequency of the modulated signal is increased only when the instantaneous amplitude of the input frequency-multiplexed signal is increased. Alternatively, the carrier frequency may be increased or decreased as the instantaneous amplitude of the input frequency-multiplexed signal is increased or decreased.

Figure 17:
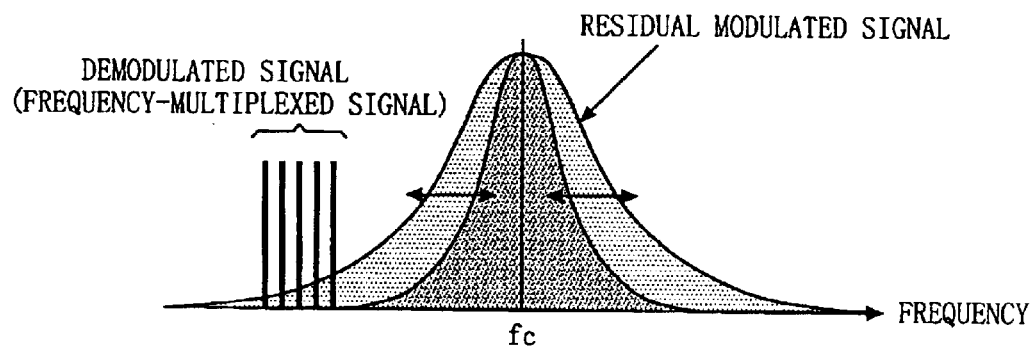
FIG. 17 is a schematic diagram illustrating variation in frequency spectrum width of a residual modulated signal component outputted from a demodulator of FIG. 14 and its interference with a demodulated signal.

With this control, as mentioned above, even when the spectrum width of the residual modulated signal is increased instantaneously according to the instantaneous amplitude increase of the frequency-multiplexed signal, interference of the residual modulated signal components with the demodulated signal can be suppressed. By way of example only, in FIG. 17, an instantaneous amplitude increase of the frequency-multiplexed signal instantaneously increases the spectrum width of the residual modulated signal, thereby causing interference with the demodulated signal. Therefore, by controlling the center frequency (carrier frequency) fc of the residual modulated signal, interference with the demodulated signal can be prevented even with an increase in the spectrum width of the residual modulated signal. This control can be made by shifting the carrier frequency of the modulated signal corresponding to the residual modulated signal to a higher frequency.

As a second method in the third embodiment, in order to modulate the input frequency multiplex signal to produce a modulated signal, the modulator 408 controls the frequency modulation efficiency of the modulated signal using the detection signal from the detector 101. In this control, the frequency modulation efficiency of the modulated signal is decreased only when the instantaneous amplitude of the input frequency-multiplexed signal is increased. Alternatively, the frequency modulation efficiency may be decreased or increased as the instantaneous amplitude is increased or decreased.

With this control, even when the spectrum width of the residual modulated signal is increased instantaneously according to the instantaneous amplitude increase in the frequency-multiplexed signal, interference of the residual modulated signal components with the demodulation signal can be suppressed.

As described above, the instantaneous amplitude increase in the frequency-multiplexed signal causes an instantaneous increase in the spectrum width of the residual modulated signal, thereby causing interference with the demodulated signal. For suppressing this interference, the frequency modulation efficiency of the modulated signal is decreased to suppress an increase in the spectrum width of the modulated signal.

Moreover, in the first embodiment, the detection signal from the detector 101 is multiplexed for transmission. In the third embodiment, however, the detection signal is not transmitted in both first and second methods. Therefore, circuits for multiplexing, transmitting, and then separating the detection signal are not required, thereby achieving a system with simple structure.

As described above, in the optical transmission system of FIG. 4, the carrier frequency or the frequency modulation efficiency of the modulated signal is controlled according to the instantaneous amplitude of the frequency-multiplexed signal. Therefore, it is possible to suppress interference of the residual modulated signal components with the demodulated signal and achieve high-quality signal transmission with less distortion with simple structure.

(Fourth Embodiment)

Figure 5:
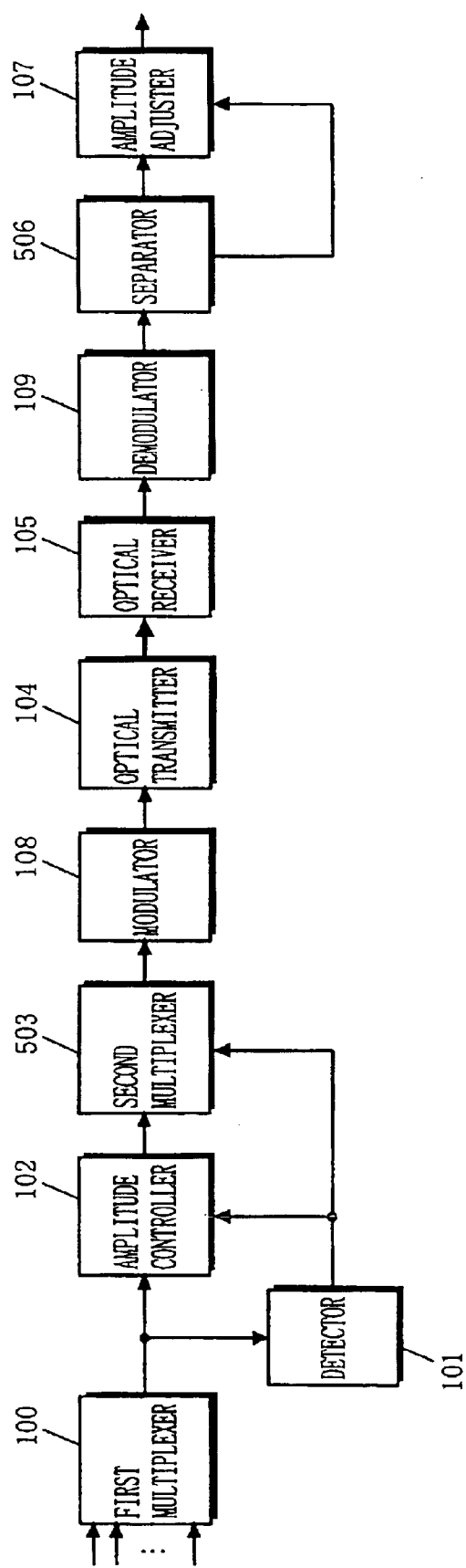
FIG. 5 is a block diagram showing the configuration of an optical transmission system according to a fourth embodiment of the present invention.

FIG. 5 is a block diagram showing an optical transmission system for a frequency-multiplexed signal according to a fourth embodiment of the present invention. In FIG. 5, the optical transmission system includes the first multiplexer 100 to which a plurality of signals having different carrier frequencies are supplied; the detector 101 to which a signal outputted from the first multiplexer 100 is supplied; the amplitude controller 102 to which the signal from the first multiplexer 100 and a signal outputted from the detector 101 are supplied; a second multiplexer 503 to which a signal outputted from the amplitude controller 102 and the signal from the detector 101 are supplied; the modulator 108 to which a signal outputted from the second multiplexer 503 is supplied; the optical transmitter 104 to which a signal outputted from the modulator 108 is supplied; the optical receiver 105 receiving an optical signal sent from the optical transmitter 104; the demodulator 109 to which a signal outputted from the optical receiver 105 is supplied; a separator 506 to which a signal outputted from the demodulator 109 is supplied; and the amplitude adjuster 107 to which a signal outputted from the separator 506 is supplied.

The fourth embodiment is different from the first embodiment in that the second multiplexer 503 and the separator 506 are newly provided instead of the second multiplexer 103 and the separator 106. The other components having the same functions as those in the first embodiment are provided with the same reference numerals, and their description is simplified herein. Mainly described below is the difference from the first embodiment.

In the above first embodiment, the second multiplexer 103 multiplexes the modulated frequency-multiplexed signal and the detection signal for optical transmission. In the receiving side, the separator 106 separates the modulated signal and the detection signal from the received signal, and then the separated modulated signal is demodulated. On the other hand, in the fourth embodiment, the second multiplexer 503 multiplexes the frequency-multiplexed signal from the amplitude controller 102 and the detection signal from the detector 101. The resultant multiplexed signal is modulated by the modulator 108 for optical transmission. In the receiving side, the optical receiver 105 converts the received optical signal into an electrical signal, and then the demodulator 109 demodulates the electrical signal. Then, the separator 506 separates the frequency-multiplexed signal and the detection signal from the demodulated signal.

As described above, in the optical transmission system of FIG. 5, the detection signal is multiplexed with the unmodulated frequency-multiplexed signal. Therefore, a channel (first channel, for example) that is different from the channels of the unmodulated frequency-multiplexed signal (second to fortieth channels, for example) is selected and assigned to the detection signal. With this assignment, the frequency-multiplexed signal and the detection signal can be modulated all at once, and the detection signal can be handled as a signal of one channel in the frequency-multiplexed signal. Therefore, the detection signal can be easily handled and circuitry can be simplified.

Therefore, in the optical system of FIG. 5, one channel of the frequency-multiplexed signal is assigned for detection signal transmission. It is thus possible to achieve high-quality signal transmission with simple structure.

(Fifth Embodiment)

Figure 6:
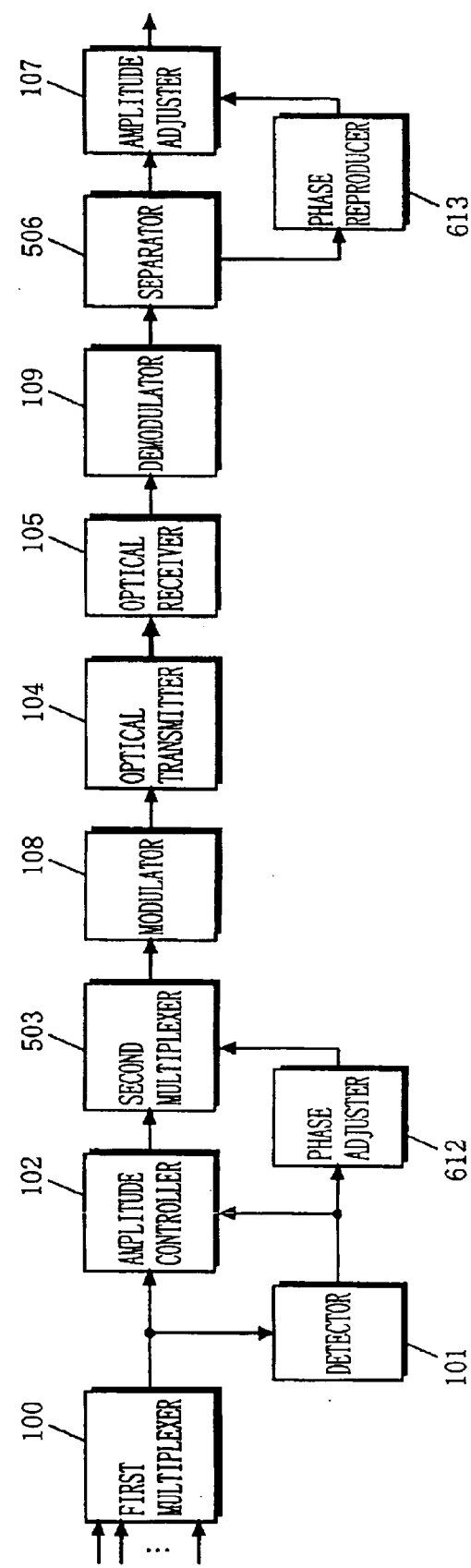
FIG. 6 is a block diagram showing the configuration of an optical transmission system according to a fifth embodiment of the present invention.

FIG. 6 is a block diagram showing an optical transmission system for a frequency-multiplexed signal according to a fifth embodiment of the present invention. In FIG. 6, the optical transmission system includes the first multiplexer 100 to which a plurality of signals having different carrier frequencies are supplied; the detector 101 to which a signal outputted from the first multiplexer 100 is supplied; the amplitude controller 102 to which the signal from the first multiplexer 100 and a signal outputted from the detector 101 are supplied; a phase adjuster 612 to which the signal from the detector 101 is supplied; the second multiplexer 503 to which a signal outputted from the amplitude controller 102 and a signal outputted from the phase adjuster 612 are supplied; the modulator 108 to which a signal outputted from the second multiplexer 503 is supplied; the optical transmitter 104 to which a signal outputted from the modulator 108 is supplied; the optical receiver 105 receiving an optical signal sent from the optical transmitter 104; the demodulator 109 to which a signal outputted from the optical receiver 105 is supplied; the separator 506 to which a signal outputted from the demodulator 109 is supplied; a phase reproducer 613 to which a signal outputted from the separator 506 is supplied; and the amplitude adjuster 107 to which a signal outputted from the phase reproducer 613 and a signal outputted from the separator 506 are supplied.

The fifth embodiment is different from the fourth embodiment in that the phase adjuster 612 and the phase reproducer 613 are newly provided. The other components having the same functions as those in the fourth embodiment are provided with the same reference numerals, and their description is simplified herein. Mainly described below is the difference from the fourth embodiment.

In the fourth embodiment, the detection signal is multiplexed with the frequency-multiplexed signal for modulation and optical transmission. In the receiving side, after the modulated signal is demodulated, the detection signal is separated therefrom for reproducing the instantaneous amplitude of the frequency-multiplexed signal.

On the other hand, in the fifth embodiment, the detection signal from the detector 101 is adjusted in phase by the phase adjuster 612 according to a predetermined scheme. The phase-adjusted detection signal is multiplexed with the frequency-multiplexed signal by the second multiplexer 503 for modulation and optical transmission. In the receiving side, the optical receiver 105 converts the optical modulated signal into a modulated electrical signal. Then, the demodulator 109 demodulates the modulated electrical signal. The separator 506 separates the frequency-multiplexed signal and the detection signal from the demodulated signal. The phase of the separated detection signal is reproduced by the phase reproducer 613 according to a scheme used in the phase adjuster 612 in reverse. By referring to the detection signal with its phase reproduced, the amplitude adjuster 107 reproduces the instantaneous amplitude of the frequency-multiplexed signal.

Figure 7A:
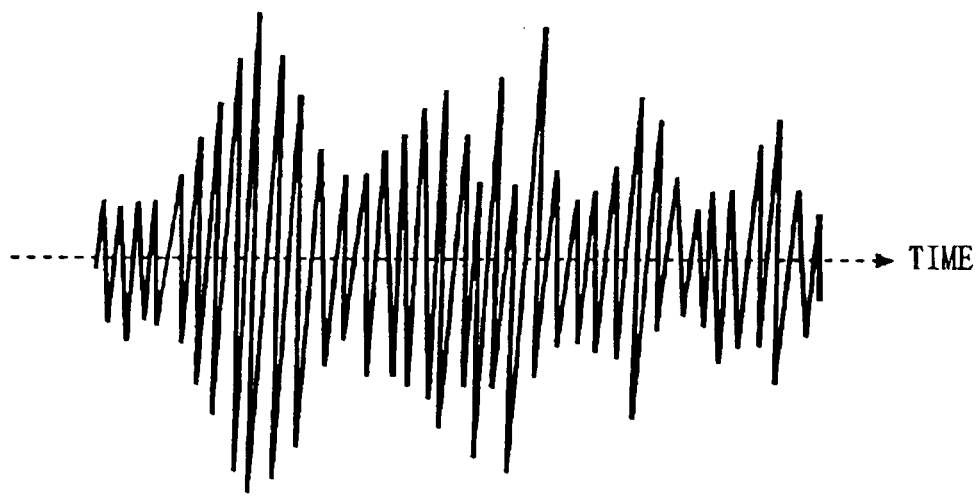
FIG. 7A is a graph illustrating the waveform of a frequency-multiplexed signal on a time axis.
Figure 7B:
FIG. 7B is a graph illustrating, on a time axis, the waveform of a frequency-multiplexed signal outputted from an amplitude controller 102 with instantaneous amplitude variation suppressed.
Figure 7C:
FIG. 7C is a graph illustrating, on a time axis, the waveform of the detection signal outputted from a phase adjuster 612 after it is phase adjusted.

Considered next is the scheme for phase adjustment. FIG. 7A is a graph illustrating the waveform of the frequency-multiplexed signal on a time axis. FIG. 7B is a graph illustrating, on the time axis, the waveform of the frequency-multiplexed signal outputted from the amplitude controller 102 after its instantaneous amplitude variations are suppressed. FIG. 7C is a graph illustrating the waveform of the detection signal outputted from the phase adjuster 612 after its phase is adjusted.

As shown in the drawings, the instantaneous amplitude variations in the frequency-multiplexed signal shown in FIG. 7B and the variations in the phase-adjusted detection signal shown in FIG. 7C are 180 degrees out of phase with each other. As such, the detection signal is adjusted to become 180 degrees out of phase with the frequency-multiplexed signal whose instantaneous amplitude variations are suppressed. Then, these signals are multiplexed for optical transmission. With this adjustment, the amplitude variations of these signals cancel each other out, thereby preventing variation in amplitude of the multiplexed signal from becoming large.

In the receiving side, the detection signal separated from the frequency-multiplexed signal is readjusted in phase so as to be back to the original state with respect to the frequency-multiplexed signal. Then, the phase-readjusted detection signal is used as a control signal for reproducing the instantaneous amplitude of the frequency-multiplexed signal.

As described above, in the optical system of FIG. 6, the detection signal is optimally adjusted in phase so that the variations in instantaneous amplitude of the multiplexed signal are not intensified, and then multiplexed with the frequency-multiplexed signal for transmission. It is therefore possible to more effectively suppress interference with the demodulated signal that the residual modulated signal component may cause due to an instantaneous amplitude increase in the frequency-multiplexed signal. Also, the spectrum width of the transmission signal can be limited to a predetermined bandwidth by design. As such, the optical transmission system of FIG. 6 can achieve high-quality signal transmission with less distortion.

(Sixth Embodiment)

Figure 8:
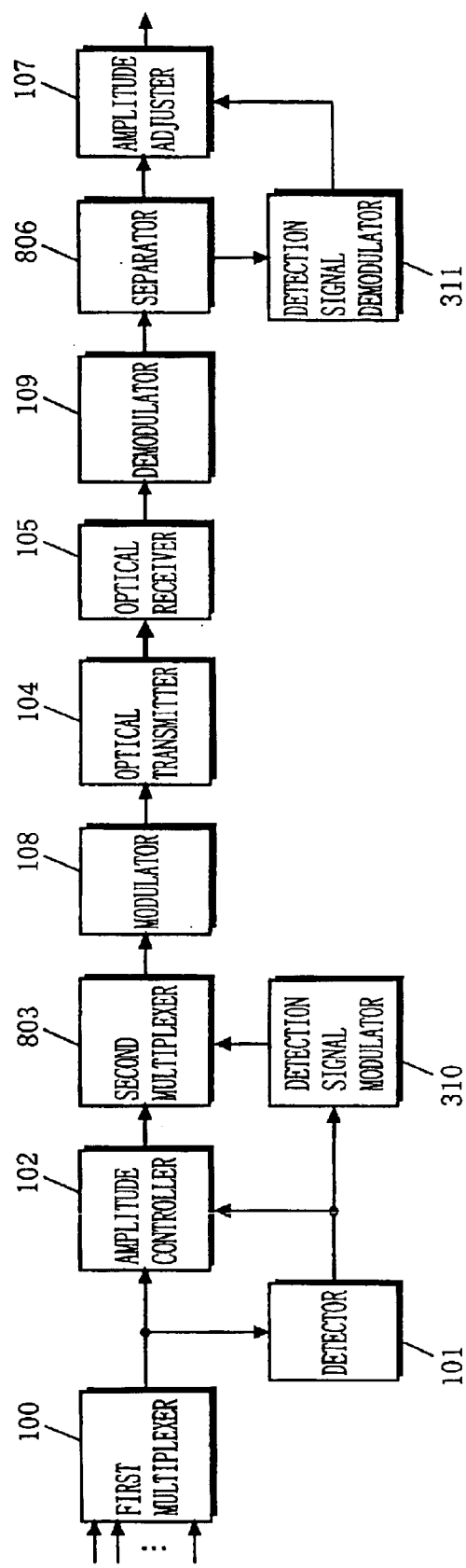
FIG. 8 is a block diagram showing the configuration of an optical transmission system according to a sixth embodiment of the present invention.

FIG. 8 is a block diagram showing an optical transmission system for a frequency-multiplexed signal according to a sixth embodiment of the present invention. In FIG. 8, the optical transmission system includes the first multiplexer 100 to which a plurality of signals having different carrier frequencies are supplied; the detector 101 to which a signal outputted from the first multiplexer 100 is supplied; the amplitude controller 102 to which the signal from the first multiplexer 100 and a signal outputted from the detector 101 are supplied; the detection signal modulator 310 to which the signal from the detector 101 is supplied; a second multiplexer 803 to which a signal outputted from the amplitude controller 102 and the signal outputted from the detection signal modulator 310 are supplied; the modulator 108 to which a signal outputted from the second multiplexer 803 is supplied; the optical transmitter 104 to which a signal outputted from the modulator 108 is supplied; the optical receiver 105 receiving an optical signal sent from the optical transmitter 104; the demodulator 109 to which a signal outputted from the optical receiver 105 is supplied; a separator 806 to which a signal outputted from the demodulator 109 is supplied; the detection signal demodulator 311 to which a signal outputted from the separator 806 is supplied; and the amplitude adjuster 107 to which a signal outputted from the detection signal demodulator 311 and the signal from the separator 806 are supplied.

The sixth embodiment is different from the second embodiment in that the second multiplexer 803 and the separator 806 are newly provided instead of the second multiplexer 103 and the separator 106. The other components having the same functions as those in the second embodiment are provided with the same reference numerals, and their description is simplified herein. Mainly described below is the difference from the second embodiment.

In the second embodiment, the second multiplexer 103 multiplexes the modulated detection signal and the modulated frequency-multiplexed signal for optical transmission. In the receiving side, the separator 106 separates the modulated signal and the modulated detection signal from the received signal, and each of the separated signals is demodulated.

However, in the sixth embodiment, the second multiplexer 803 multiplexes the modulated detection signal and the frequency-multiplexed signal, and the obtained multiplexed signal is modulated before optical transmission. In the receiving side, the received signal is first demodulated, and then the separator 806 separates the frequency-multiplexed signal and the modulated detection signal from the demodulated signal. The separated detection signal is demodulated by the detection signal demodulator 311, and then used for reproducing the instantaneous amplitude of the frequency-multiplexed signal.

Therefore, the modulated detection signal is multiplexed with the unmodulated frequency-multiplexed signal. More specifically, a channel (a fortieth channel, for example) that is different from the channels of the unmodulated frequency-multiplexed signal (first to thirty-ninth channels, for example) is selected and assigned to the modulated detection signal.

Here, the detection signal is modulated by the detection signal modulator 310 because the carrier frequency thereof is varied to become a predetermined frequency of one channel assigned (fortieth channel, for example).

Thus, the modulated detection signal and the frequency-multiplexed signal can be modulated all at once. Also, the detection signal can be easily handled as a signal of one channel in the frequency-multiplexed signal.

Therefore, in the optical transmission system of FIG. 8, one channel of the frequency-multiplexed signal is assigned for detection signal transmission. It is therefore possible to achieve high-quality signal transmission with simpler and flexible structure.

(Seventh Embodiment)

Figure 9:
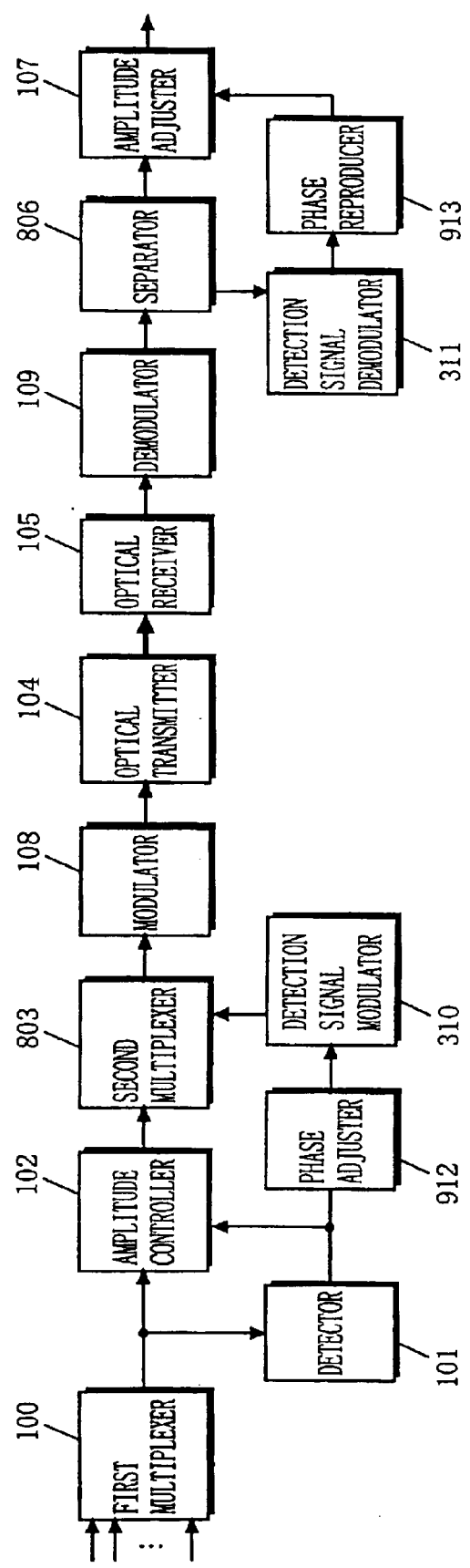
FIG. 9 is a block diagram showing the configuration of an optical transmission system according to a seventh embodiment of the present invention.

FIG. 9 is a block diagram showing an optical transmission system for a frequency-multiplexed signal according to a seventh embodiment of the present invention. In FIG. 9, the optical transmission system includes the first multiplexer 100 to which a plurality of signals having different carrier frequencies are supplied; the detector 101 to which a signal outputted from the first multiplexer 100 is supplied; the amplitude controller 102 to which the signal from the first multiplexer 100 and a signal outputted from the detector 101 are supplied; a phase adjuster 912 to which the signal from the detector 101 is supplied; the detection signal modulator 310 to which a signal outputted from the phase adjuster 912 is supplied; the second multiplexer 803 to which a signal outputted from the amplitude controller 102 and a signal outputted from the detection signal modulator 310 are supplied; the modulator 108 to which a signal outputted from the second multiplexer 803 is supplied; the optical transmitter 104 to which a signal outputted from the modulator 108 is supplied; the optical receiver 105 receiving an optical signal sent from the optical transmitter 104; the demodulator 109 to which a signal outputted from the optical receiver 105 is supplied; the separator 806 to which a signal outputted from the demodulator 109 is supplied; the detection signal demodulator 311 to which a signal outputted from the separator 806 is supplied; a phase reproducer 913 to which a signal outputted from the detection signal demodulator 311 is supplied; and the amplitude adjuster 107 to which a signal outputted from the phase reproducer 913 and a signal from the demodulator 806 are supplied.

The seventh embodiment is different from the sixth embodiment in that the phase adjuster 912 and the phase reproducer 913 are newly provided. The other components having the same functions as those in the sixth embodiment are provided with the same reference numerals, and their description is simplified herein. Mainly described below is the difference from the sixth embodiment.

In the sixth embodiment, the modulated detection signal is multiplexed with the frequency-multiplexed signal. The resultant multiplexed signal is modulated for optical transmission. In the receiving side, the modulated signal is demodulated, and the modulated detection signal is separated from the demodulated frequency-multiplexed signal. With the modulated detection signal demodulated, the instantaneous amplitude of the frequency-multiplexed signal is reproduced.

However, in the present embodiment, the detection signal is adjusted in phase by the phase adjuster 912 according to a predetermined scheme, modulated, and then multiplexed with the frequency-multiplexed signal. The resultant multiplexed signal is modulated for optical transmission. In the receiving side, the modulated signal is demodulated, and the modulated detection signal is separated from the demodulated frequency-multiplexed signal. The modulated detection signal is demodulated, and adjusted in phase by the phase reproducer 913 according to a scheme used by the phase adjuster 912 in reverse. With the phase-adjusted detection signal, the instantaneous amplitude of the frequency-multiplexed signal is reproduced.

Note that the predetermined scheme is similar to that of the fifth embodiment. That is, the phase adjuster 912 adjusts the phase of the detection signal so that the variations in suppressed instantaneous amplitude of the frequency-multiplexed signal and the variations in the modulated detection signal are 180 degrees out of phase. After that, the phase-adjusted detection signal is modulated and multiplexed for optical transmission. In the receiving side, the detection signal is separated from the frequency-multiplexed signal, demodulated, and then readjusted in phase to be back to the original phase state with respect to the frequency-multiplexed signal. The phase-readjusted detection signal is used as a control signal for reproducing the instantaneous amplitude of the frequency-multiplexed signal.

As described above, in the optical transmission system of FIG. 9, the detection signal is optimally adjusted in phase so that the variations in the instantaneous amplitude of the frequency-multiplexed signal are not intensified, and then multiplexed with the frequency-multiplexed signal for transmission. It is therefore possible to effectively suppress interference with the demodulated signal that the residual modulated signal component may cause due to an instantaneous amplitude increase in the frequency-multiplexed signal. Also, the spectrum width of the transmission signal can be limited to a predetermined bandwidth by design. As such, the optical transmission system of FIG. 9 can achieve high-quality signal transmission with less distortion.

(Eighth Embodiment)

Figure 10:
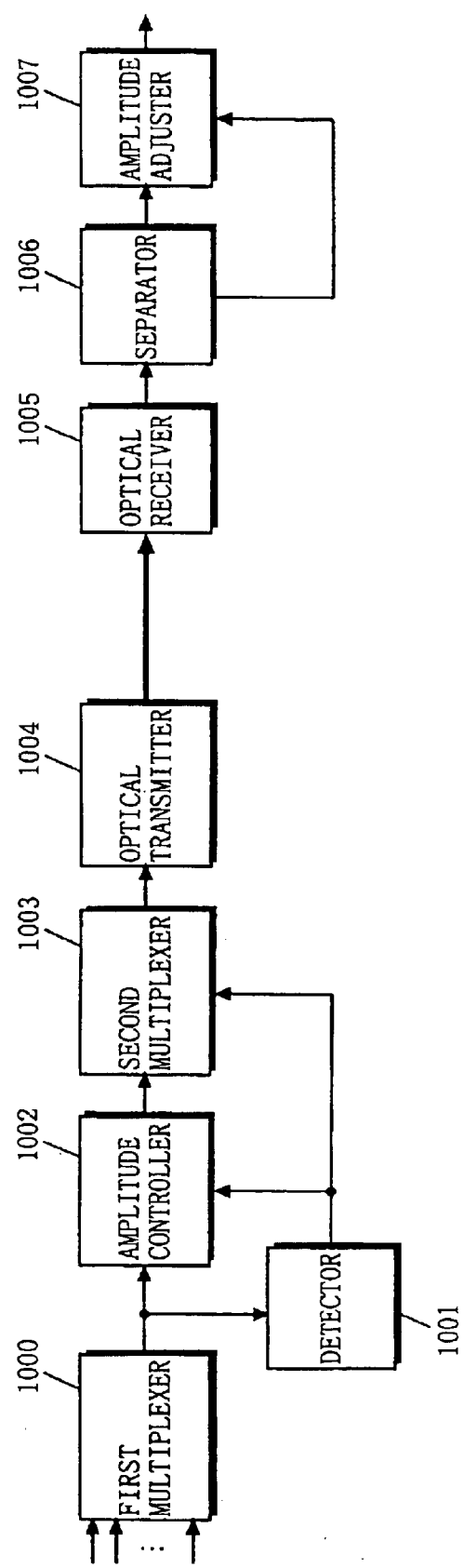
FIG. 10 is a block diagram showing the configuration of an optical transmission system according to an eighth embodiment of the present invention.

FIG. 10 is a block diagram showing an optical transmission system for a frequency-multiplexed signal according to an eighth embodiment of the present invention. In FIG. 10, the optical transmission system includes a first multiplexer 1000 to which a plurality of signals having different carrier frequencies are supplied; a detector 1001 to which a signal outputted from the first multiplexer 1000 is supplied; an amplitude controller 1002 to which the signal from the first multiplexer 1000 and a signal outputted from the detector 1001 are supplied; a second multiplexer 1003 to which a signal outputted from the amplitude controller 1002 and the signal from the detector 1001 are supplied; an optical transmitter 1004 to which a signal outputted from the second multiplexer 1003 is supplied; an optical receiver 1005 for receiving an optical signal sent from the optical transmitter 1004; a separator 1006 to which a signal outputted from the optical receiver 1005 is supplied; and an amplitude adjuster 1007 to which two signals outputted from the separator 1006 are supplied.

Next, the operation of the optical transmission system according to the eighth embodiment as shown in FIG. 10 is described. The first multiplexer 1000 frequency-multiplexes a plurality of signals having predetermined different carrier frequencies. The detector 1001 detects instantaneous amplitude variation of the frequency-multiplexed signal outputted from the first multiplexer 1000, and outputs the detection result as a detection signal. The amplitude controller 1002 is implemented as a variable gain amplifier, for example, as mentioned above. The amplitude controller 1002 increases or decreases gain by referring to the detection signal to control the instantaneous amplitude variations of the frequency-multiplexed signal to become moderate, and more ideally, under a predetermined value. The second multiplexer 1003 multiplexes the frequency-multiplexed signal outputted from the amplitude controller 1002 and the detection signal. The optical transmitter 1004 converts the multiplexed signal outputted from the second multiplexer 1003 into an optical modulated signal, and sends the same to an optical transmission path or the like (not shown). The optical receiver 1005 converts the optical modulated signal received through the optical transmission path into an electrical signal. The separator 1006 separates the frequency-multiplexed signal and the detection signal from the electrical signal outputted from the optical receiver 1005. The amplitude adjuster 1007 adjusts the instantaneous amplitude of the frequency-multiplexed signal by referring to the detection signal outputted from the separator 1006, and outputs the frequency-multiplexed signal having instantaneous amplitude variation in accordance with the frequency-multiplexed signal outputted from the multiplexer 1000.

Figure 18:
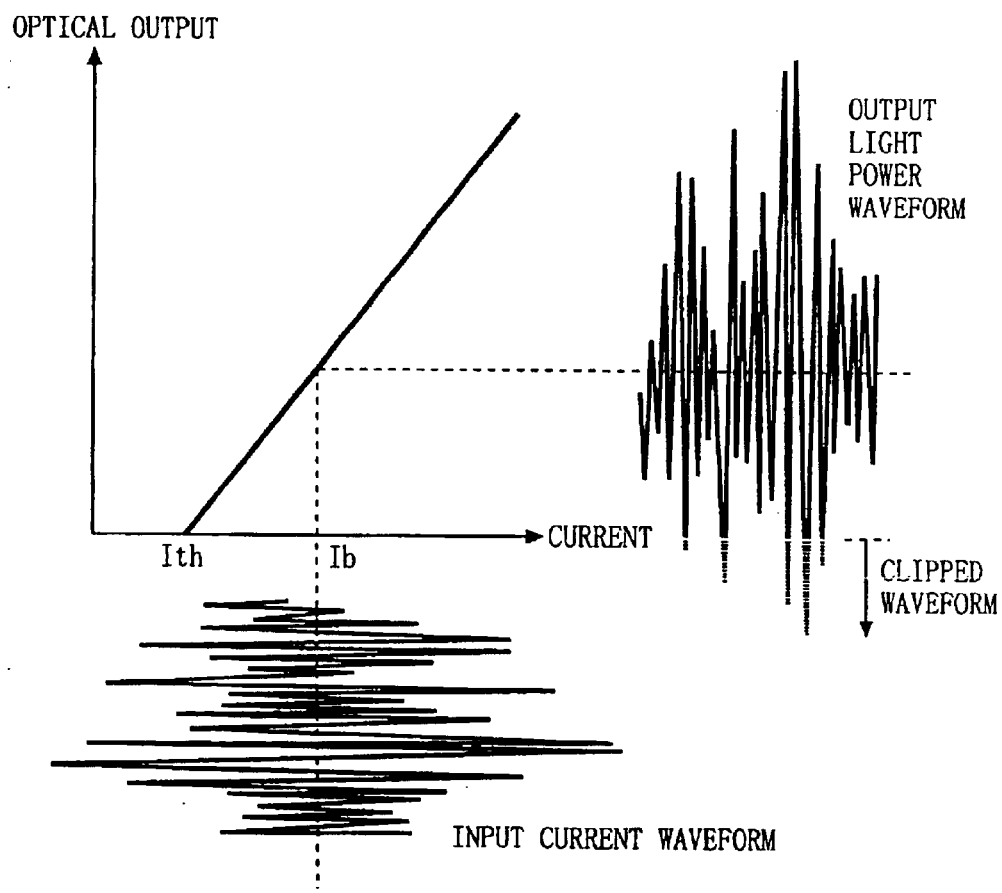
FIG. 18 is a schematic diagram illustrating clipping of a frequency-multiplexed signal in an optical transmitter of FIG. 15.

As described above, in the optical transmission system of FIG. 10, the instantaneous amplitude variation components of the frequency-multiplexed signal are suppressed for optical transmission. Then, these components are again provided to reproduce the original frequency-multiplexed signal. With this technique, it is possible to ease the occurrence of clipping in the optical transmitter 1004 due to an instantaneous amplitude increase of the frequency-multiplexed signal. In other words, the amplitude controller 1002 controls the instantaneous amplitude variation of the frequency-multiplexed signal to become moderate and, more ideally, under a predetermined value. Therefore, as shown in FIG. 18, the amplitude of the signal injected to a laser never becomes smaller than the threshold (Ith). Thus, in the output light power waveform, clipping that can cause waveform distortion never occurs.

Therefore, in the eighth embodiment, it is possible to suppress instantaneous quality deterioration of the transmission signal and achieve signal transmission with less distortion by simpler structure without requiring FM modulation and the like.

(Ninth Embodiment)

Figure 11:
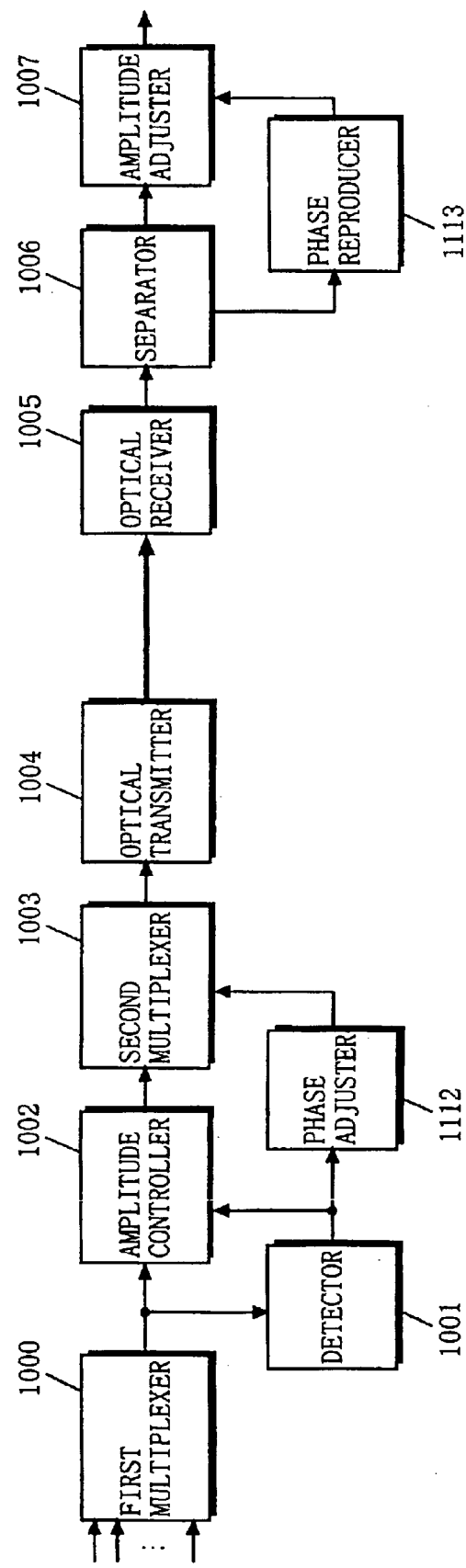
FIG. 11 is a block diagram showing the configuration of an optical transmission system according to a ninth embodiment of the present invention.

FIG. 11 is a block diagram showing an optical transmission system for a frequency-multiplexed signal according to a ninth embodiment of the present invention. In FIG. 11, the optical transmission system includes the first multiplexer 1000 to which a plurality of signals having different carrier frequencies are supplied; the detector 1001 to which a signal outputted from the first multiplexer 1000 is supplied; the amplitude controller 1002 to which the signal from the first multiplexer 1000 and a signal outputted from the detector 1001 are supplied; a phase adjuster 1112 to which the signal from the detector 1001 is supplied; the second multiplexer 1003 to which a signal outputted from the amplitude controller 1002 and a signal outputted from the phase adjuster 1112 are supplied; the optical transmitter 1004 to which a signal outputted from the second multiplexer 1003 is supplied; the optical receiver 1005 for receiving an optical signal sent from the optical transmitter 1004; the separator 1006 to which a signal outputted from the optical receiver 1005 is supplied; a phase reproducer 1113 to which a signal outputted from the separator 1006 is supplied; and the amplitude adjuster 1007 to which the signal from the separator 1006 and a signal outputted from the phase reproducer 1113 are supplied.

The ninth embodiment is different from the eighth embodiment in that the phase adjuster 1112 and the phase reproducer 1113 are newly provided. The other components having the same functions as those in the eighth embodiment are provided with the same reference numerals, and their description is simplified herein. Mainly described below is the difference from the eighth embodiment.

In the eighth embodiment, the detection signal is multiplexed with the frequency-multiplexed signal for optical transmission. In the receiving side, the detection signal is separated from the frequency-multiplexed signal. Then, by using the separated detection signal, the instantaneous amplitude of the frequency-multiplexed signal is reproduced.

However, in the ninth embodiment, the detection signal is adjusted in phase by the phase adjuster 1112 according to a predetermined scheme, and then multiplexed with the frequency-multiplexed signal for optical transmission. In the receiving side; the detection signal is separated from the frequency-multiplexed signal, and then readjusted in phase by the phase reproducer 1113 according to the scheme used in the phase adjuster 1112 in reverse.

Note that the predetermined scheme is similar to that of the fifth embodiment. That is, the phase adjuster 1112 adjusts the phase of the detection signal so that the variations in the suppressed instantaneous amplitude of the frequency-multiplexed signal and the variations in the detection signal are 180 degrees out of phase. After that, the phase-adjusted detection signal is multiplexed for optical transmission. In the receiving side, the detection signal is separated from the frequency-multiplexed signal, and then readjusted in phase to be back to the original phase state with respect to the frequency-multiplexed signal. The phase-readjusted detection signal is used as a control signal for reproducing the instantaneous amplitude of the frequency-multiplexed signal.

As described above, in the optical transmission system of FIG. 11, the detection signal is optimally adjusted in phase so that instantaneous amplitude variations of the multiplexed signal are not intensified, and then multiplexed with the frequency-multiplexed signal for transmission. It is therefore possible to more effectively suppress interference with the demodulated signal that the residual modulated signal component may cause due to an instantaneous amplitude increase of the frequency-multiplexed signal.

(Tenth Embodiment)

Figure 12:
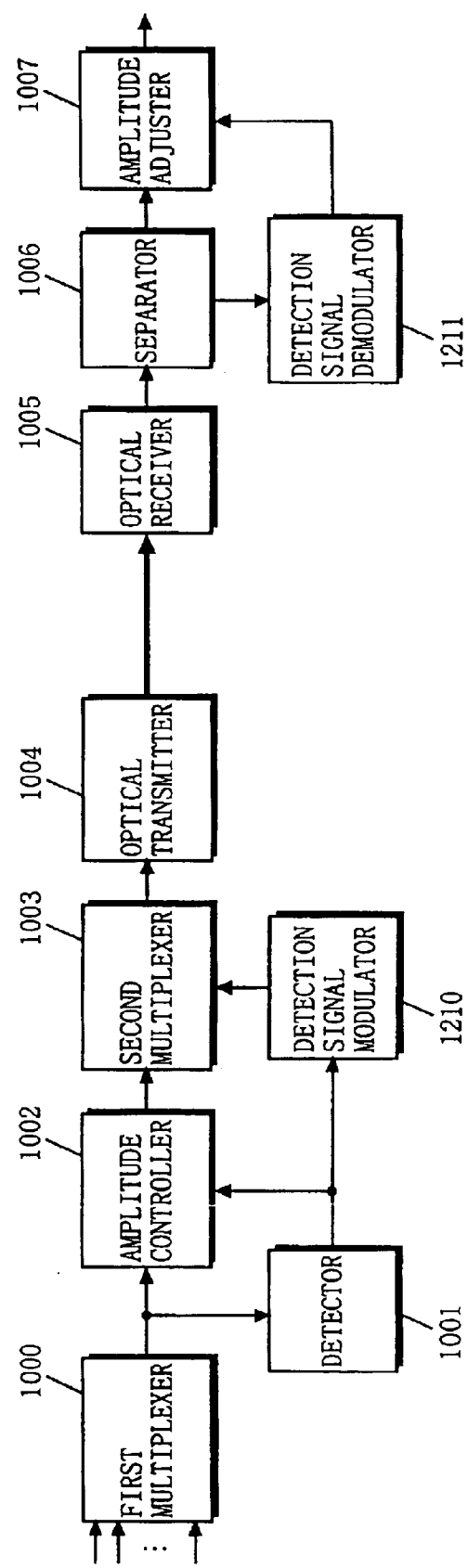
FIG. 12 is a block diagram showing the configuration of an optical transmission system according to a tenth embodiment of the present invention.

FIG. 12 is a block diagram showing an optical transmission system for a frequency-multiplexed signal according to a tenth embodiment of the present invention. In FIG. 12, the optical transmission system includes the first multiplexer 1000 to which a plurality of signals having different carrier frequencies are supplied; the detector 1001 to which a signal outputted from the first multiplexer 1000 is supplied; the amplitude controller 1002 to which the signal from the first multiplexer 1000 and a signal outputted from the detector 1001 are supplied; a detection signal modulator 1210 to which the signal from the detector 1001 is supplied; the second multiplexer 1003 to which a signal outputted from the amplitude controller 1002 and a signal from the detection signal modulator 1210 are supplied; the optical transmitter 1004 to which a signal outputted from the second multiplexer 1003 is supplied; the optical receiver 1005 for receiving an optical signal sent from the optical transmitter 1004; the separator 1006 to which a signal outputted from the optical receiver 1005 is supplied; a detection signal demodulator 1211 to which a signal outputted from the separator 1006 is supplied; and the amplitude adjuster 1007 to which a signal outputted from the separator 1006 and a signal outputted from the detection signal demodulator 1211 are supplied.

The tenth embodiment is different from the eighth embodiment in that the detection signal modulator 1210 and the detection signal demodulator 1211 are newly provided. The other components having the same functions as those in the eighth embodiment are provided with the same reference numerals, and their description is simplified herein. Mainly described below is the difference from the eighth embodiment.

In the eighth embodiment, the detection signal is directly multiplexed with the frequency-multiplexed signal for optical transmission. However, in the tenth embodiment, the detection signal is converted to be a modulated signal (modulated detection signal) having a predetermined carrier frequency. Thereafter, the modulated detection signal is multiplexed with the frequency-multiplexed signal for optical transmission. In the receiving side, the modulated detection signal is separated from the frequency-multiplexed signal, and then demodulated by the detection signal demodulator 1211 to be the detection signal. The demodulated detection signal is used for reproducing the instantaneous amplitude of the frequency-multiplexed signal.

As described above, in the optical transmission system of FIG. 12, like the system of FIG. 8, the detection signal is modulated, and one channel of the frequency-multiplexed signal is assigned for transmitting the modulated detection signal. If so, the frequency-multiplexed signal and the detection signal can be transmitted all at once, and the detection signal can be handled as a signal of one channel in the frequency-multiplexed signal. Therefore, the detection signal can be easily handled.

Thus, in the optical transmission system of FIG. 12, high-quality signal transmission can be achieved with more flexible and simpler structure.

(Eleventh Embodiment)

Figure 13:
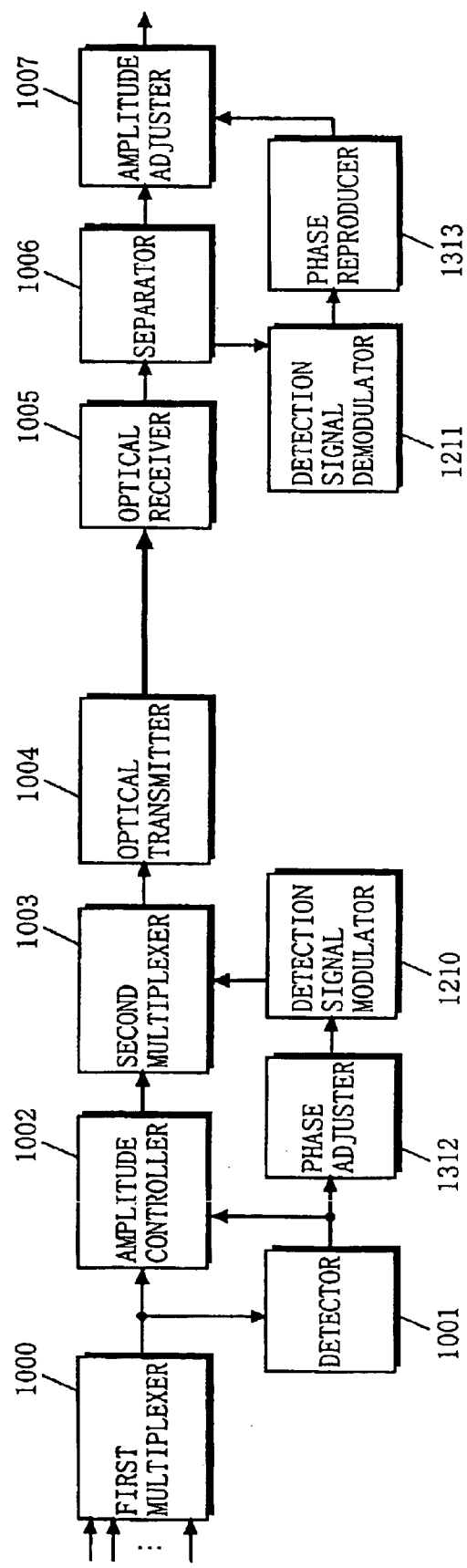
FIG. 13 is a block diagram showing the configuration of an optical transmission system according to an eleventh embodiment of the present invention.
Figure 14:
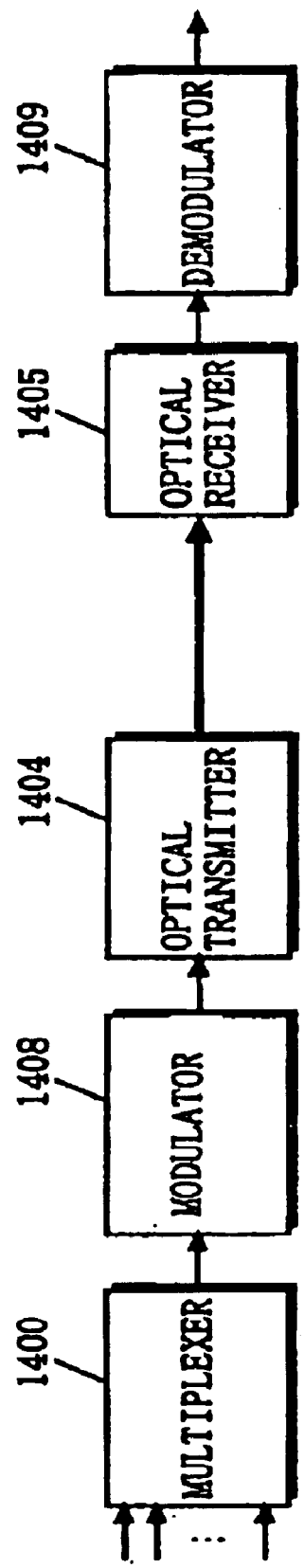
FIG. 14 is a block diagram showing an optical transmission system of a first background art.
Figure 15:
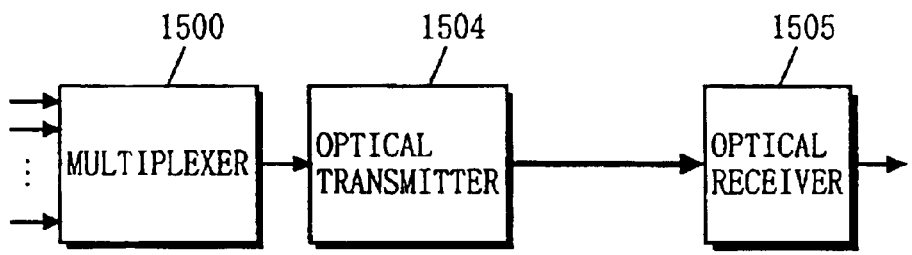
FIG. 15 is a block diagram showing an optical transmission system of a second background art.
Figure 16:
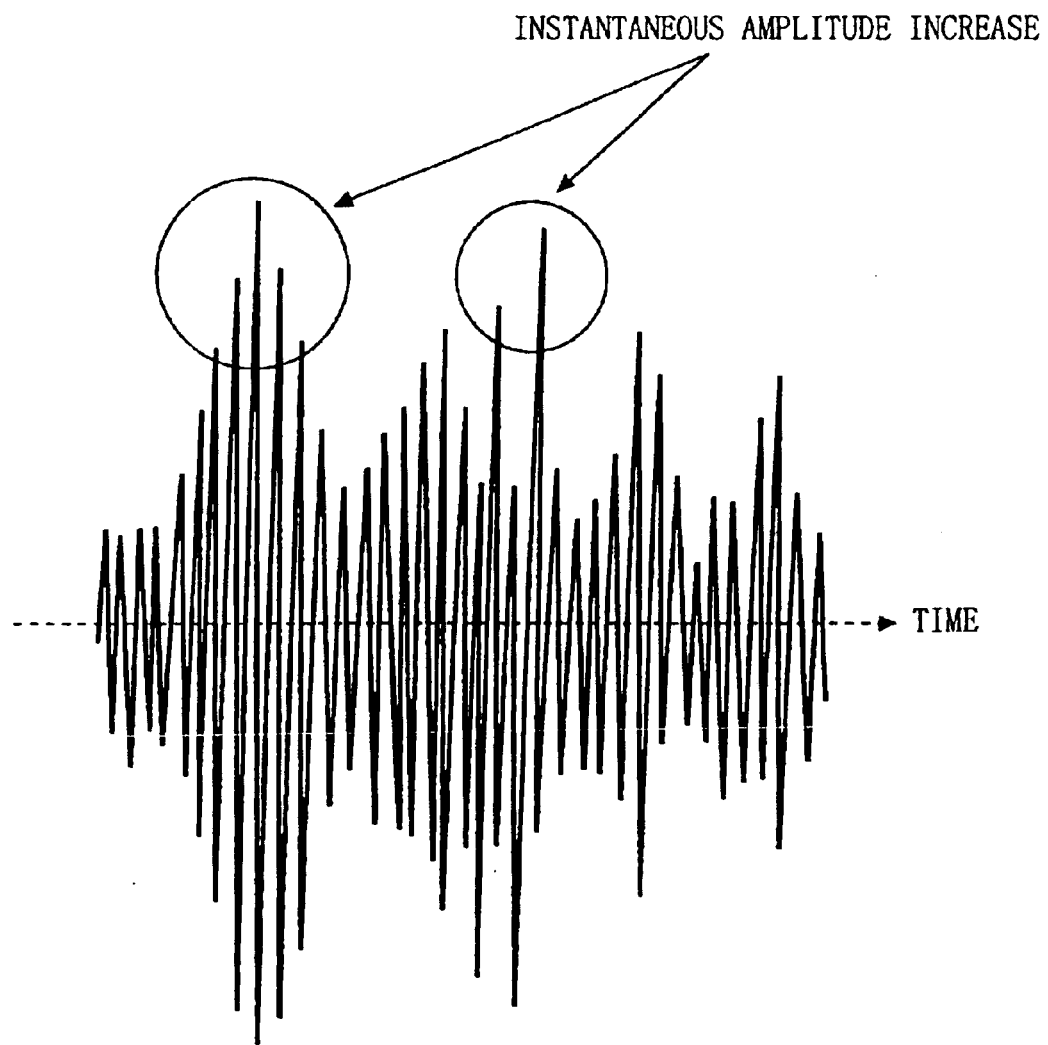
FIG. 16 is a schematic diagram illustrating instantaneous amplitude variation of a frequency-multiplexed signal.

FIG. 13 is a block diagram showing an optical transmission system for a frequency-multiplexed signal according to an eleventh embodiment of the present invention. In FIG. 13, the optical transmission system includes the first multiplexer 1000 to which a plurality of signals having different carrier frequencies are supplied; the detector 1001 to which a signal outputted from the first multiplexer 1000 is supplied; the amplitude controller 1002 to which the signal from the first multiplexer 1000 and a signal outputted from the detector 1001 are supplied; a phase adjuster 1312 to which the signal from the detector 1001 is supplied; the detection signal modulator 1210 to which a signal outputted from the phase adjuster 1312 is supplied; the second multiplexer 1003 to which a signal outputted from the amplitude controller 1002 and a signal from the detection signal modulator 1210 are supplied; the optical transmitter 1004 to which a signal outputted from the second multiplexer 1003 is supplied; the optical receiver 1005 for receiving an optical signal sent from the optical transmitter 1004; the separator 1006 to which a signal outputted from the optical receiver 1005 is supplied; the detection signal demodulator 1211 to which a signal outputted from the separator 1006 is supplied; a phase reproducer 1313 to which a signal outputted from the detection signal demodulator 1211 is supplied; and the amplitude adjuster 1007 to which a signal outputted from the separator 1006 and a signal outputted from the phase reproducer 1313 are supplied.

The eleventh embodiment is different from the tenth embodiment in that the phase adjuster 1312 and the phase reproducer 1313 are newly provided. The other components having the same functions as those in the tenth embodiment are provided with the same reference numerals, and their description is simplified herein. Mainly described below is the difference from the tenth embodiment.

In the tenth embodiment, the modulated detection signal is multiplexed with the frequency-multiplexed signal for optical transmission. In the receiving side, the frequency-multiplexed signal and the modulated detection signal are separated from the multiplexed signal. Then, by using the demodulated detection signal, the instantaneous amplitude of the frequency-multiplexed signal is reproduced.

However, in the eleventh embodiment, the detection signal is adjusted in phase by the phase adjuster 1312 according to a predetermined scheme, modulated, and then multiplexed with the frequency-multiplexed signal for optical transmission. In the receiving side, the modulated detection signal is separated from the multiplexed signal, and then demodulated to be the detection signal. The detection signal is readjusted in phase by the phase reproducer 1313 according to a scheme used in the phase adjuster 1312 in reverse. With this phase-readjusted detection signal, the instantaneous amplitude of the frequency-multiplexed signal is reproduced.

Note that the predetermined scheme is similar to that of the seventh embodiment as shown in FIG. 9, for example. That is, the amplitude controller 1002 adjusts the phase of the detection signal so that variations in the suppressed instantaneous amplitude of the frequency-multiplexed signal and variation in the modulated detection signal are 180 degrees out of phase. After that, the phase-adjusted detection signal is modulated and multiplexed for optical transmission. In the receiving side, the detection signal is separated from the frequency-multiplexed signal, demodulated, and then readjusted in phase to be back to the original phase state with respect to the frequency-multiplexed signal. The phase-readjusted detection signal is used as a control signal for reproducing the instantaneous amplitude of the frequency-multiplexed signal.

As described above, in the optical transmission system of FIG. 13, the detection signal is optimally adjusted in phase so that instantaneous amplitude variation of the multiplexed signal is not intensified, and then multiplexed with the frequency-multiplexed signal for transmission. It is therefore possible to more effectively suppress, with simple and flexible structure, instantaneous quality deterioration of the transmission signal due to clipping, achieving signal transmission with less distortion.

While the invention has been described in detail, the foregoing description is in all aspects illustrative and not restrictive. It is understood that numerous other modifications and variations can be devised without departing from the scope of the invention.

What is claimed is:

1. A system for optically transmitting a frequency-multiplexed signal with a plurality of signals frequency-multiplexed, said system comprising:
   a detector, provided with the frequency-multiplexed signal, for outputting a detection signal corresponding to an amplitude variation of the frequency-multiplexed signal;
   an amplitude controller for adjusting an amplitude of the frequency-multiplexed signal by referring to the detection signal outputted from said detector, and outputting a suppressed multiplexed signal, which is the frequency-multiplexed signal with an instantaneous amplitude variation suppressed;
   a modulator for modulating the suppressed multiplexed signal outputted from said amplitude controller to produce a modulated signal;
   a detection signal modulator for modulating the detection signal outputted from said detector to produce a modulated detection signal;
   a multiplexer for multiplexing the modulated signal outputted from said modulator and the modulated detection signal outputted from said detection signal modulator to produce a multiplexed signal;
   an optical transmitter for converting the multiplexed signal outputted from said multiplexer into an optical signal;
   an optical receiver for converting the optical signal sent from said optical transmitter into an electrical signal;
   a separator for separating the modulated signal and the modulated detection signal from the electrical signal outputted from said optical receiver;
   a demodulator for demodulating the modulated signal outputted from said separator to output the suppressed multiplexed signal;
   a detection signal demodulator for demodulating the modulated detection signal outputted from said separator to output the detection signal; and
   an amplitude adjuster for adjusting, by referring to the detection signal outputted from said detection signal demodulator, an amplitude of the suppressed multiplexed signal outputted from said demodulator to output the frequency-multiplexed signal corresponding to the frequency-multiplexed signal provided to said detector.

2. The optical transmission system according to claim 1, wherein
   said amplitude controller adjusts an instantaneous amplitude of the frequency-multiplexed signal to be held under a predetermined value.

3. The optical transmission system according to claim 1, wherein
   an entire or part of an occupied frequency band of the modulated detection signal outputted from said detection signal modulator is different from an occupied frequency band of the modulated signal multiplexed in said multiplexer.

4. A system for optically transmitting a frequency-multiplexed signal with a plurality of signals frequency-multiplexed, said system comprising:
   a detector, provided with the frequency-multiplexed signal, for outputting a detection signal corresponding to an amplitude variation of the frequency-multiplexed signal;
   an amplitude controller for adjusting an amplitude of the frequency-multiplexed signal by referring to the detection signal outputted from said detector, and outputting a suppressed multiplexed signal, which is the frequency-multiplexed signal with an instantaneous amplitude variation suppressed;
   a detection signal modulator for modulating the detection signal outputted from said detector to produce a modulated detection signal;
   a multiplexer for multiplexing the suppressed multiplexed signal outputted from said amplitude controller and the modulated detection signal outputted from said detection signal modulator to produce a multiplexed signal;
   a modulator for modulating the multiplexed signal outputted from said multiplexer to produce a modulated signal;
   an optical transmitter for converting the modulated signal outputted from said modulator into an optical signal;
   an optical receiver for converting the optical signal sent from said optical transmitter into an electrical signal;
   a demodulator for demodulating the electrical signal outputted from said optical receiver to produce a demodulated signal;

a separator for separating the suppressed multiplexed signal and the modulated detection signal from the demodulated signal outputted from said demodulator;

a detection signal demodulator for demodulating the modulated detection signal outputted from said separator to output the detection signal; and an amplitude adjuster for adjusting, by referring to the detection signal outputted from said detection signal demodulator, an amplitude of the suppressed multiplexed signal outputted from said separator to output the frequency-multiplexed signal corresponding to the frequency-multiplexed signal provided to said detector.

5. The optical transmission system according to claim 4, wherein
said amplitude controller adjusts an instantaneous amplitude of the frequency-multiplexed signal to be held under a predetermined value.

6. The optical transmission system according to claim 4, wherein
an entire or part of an occupied frequency band of the modulated detection signal outputted from said detection signal modulator is different from an occupied frequency band of the suppressed multiplexed signal obtained in said multiplexer.

7. A system for optically transmitting a frequency-multiplexed signal with a plurality of signals frequency-multiplexed, said system comprising:

a detector, provided with the frequency-multiplexed signal, for outputting a detection signal corresponding to an amplitude variation of the frequency-multiplexed signal;

an amplitude controller for adjusting an amplitude of the frequency-multiplexed signal by referring to the detection signal outputted from said detector, and outputting a suppressed multiplexed signal, which is the frequency-multiplexed signal with an instantaneous amplitude variation suppressed;

a phase adjuster for adjusting a phase of the detection signal outputted from said detector to produce a phase-adjusted detection signal;

a detection signal modulator for modulating the phase-adjusted detection signal outputted from said phase adjuster to produce a modulated detection signal;

a multiplexer for multiplexing the suppressed multiplexed signal outputted from said amplitude controller and the modulated detection signal outputted from said detection signal modulator to produce a multiplexed signal;

a modulator for modulating the multiplexed signal to produce a modulated signal;

an optical transmitter for converting the modulated signal outputted from said modulator into an optical signal;

an optical receiver for converting the optical signal sent from said optical transmitter into an electrical signal;

a demodulator for demodulating the electrical signal outputted from said optical receiver to produce a demodulated signal;

a separator for separating the suppressed multiplexed signal and the modulated detection signal from the demodulated signal outputted from said demodulator;

a detection signal demodulator for demodulating the modulated detection signal outputted from said separator to output the phase-adjusted detection signal before modulation;

a phase reproducer for adjusting a phase of the phase-adjusted detection signal outputted from said detection signal demodulator to output the detection signal before phase adjustment; and an amplitude adjuster for adjusting, by referring to the detection signal outputted from said phase reproducer, an amplitude of the suppressed multiplexed signal outputted from said separator to output the frequency-multiplexed signal corresponding to the frequency-multiplexed signal provided to said detector.

8. The optical transmission system according to claim 7, wherein
said amplitude controller adjusts an instantaneous amplitude of the frequency-multiplexed signal to be held under a predetermined value.

9. The optical transmission system according to claim 7, wherein
an entire or part of an occupied frequency band of the modulated detection signal outputted from said detection signal modulator is different from an occupied frequency band of the suppressed multiplexed signal obtained in said multiplexer.

10. The optical transmission system according to claim 7, wherein
said phase adjuster adjusts the phase of the detection signal so that instantaneous amplitude variations of the suppressed multiplexed signal and the modulated detection signal multiplexed in said multiplexer are opposite in polarity.

11. A system for optically transmitting a frequency-multiplexed signal with a plurality of signals frequency-multiplexed, said system comprising:

a detector, provided with the frequency-multiplexed signal, for outputting a detection signal corresponding to an amplitude variation of the frequency-multiplexed signal;

an amplitude controller for adjusting an amplitude of the frequency-multiplexed signal by referring to the detection signal outputted from said detector, and outputting a suppressed multiplexed signal, which is the frequency-multiplexed signal with an instantaneous amplitude variation suppressed;

a detection signal modulator for modulating the detection signal outputted from said detector to produce a modulated detection signal;

a multiplexer for multiplexing the suppressed multiplexed signal outputted from said amplitude controller and the modulated detection signal outputted from said detection signal modulator to produce a multiplexed signal;

an optical transmitter for converting the multiplexed signal outputted from said multiplexer into an optical signal;

an optical receiver for converting the optical signal sent from said optical transmitter into an electrical signal;

a separator for separating the suppressed multiplexed signal and the modulated detection signal from the electrical signal outputted from said optical receiver;

a detection signal demodulator for demodulating the modulated detection signal outputted from said separator to output the detection signal; and an amplitude adjuster for adjusting, by referring to the detection signal outputted from said detection signal demodulator, an amplitude of the suppressed multiplexed signal outputted from said separator to output the frequency-multiplexed signal corresponding to the frequency-multiplexed signal provided to said detector.

12. The optical transmission system according to claim 11, wherein said amplitude controller adjusts an instantaneous amplitude of the frequency-multiplexed signal to be held under a predetermined value.

13. The optical transmission system according to claim 11, wherein an entire or part of an occupied frequency band of the modulated detection signal outputted from said detection signal modulator is different from an occupied frequency band of the suppressed multiplexed signal obtained in said multiplexer.

14. A system for optically transmitting a frequency-multiplexed signal with a plurality of signals frequency-multiplexed, said system comprising:

a detector, provided with the frequency-multiplexed signal, for outputting a detection signal corresponding to an amplitude variation of the frequency-multiplexed signal;

an amplitude controller for adjusting an amplitude of said frequency-multiplexed signal by referring to the detection signal outputted from said detector, and outputting a suppressed multiplexed signal, which is the frequency-multiplexed signal with an instantaneous amplitude variation suppressed;

a phase adjuster for adjusting a phase of the detection signal outputted from said detector to produce a phase-adjusted detection signal;

a detection signal modulator for modulating the phase-adjusted detection signal outputted from said phase adjuster to produce a modulated detection signal;

a multiplexer for multiplexing the suppressed multiplexed signal outputted from said amplitude controller and the modulated detection signal outputted from said detection signal modulator to produce a multiplexed signal;

an optical transmitter for converting the multiplexed signal outputted from said multiplexer into an optical signal;

an optical receiver for converting the optical signal sent from said optical transmitter into an electrical signal;

a separator for separating the suppressed multiplexed signal and the modulated detection signal from the electrical signal outputted from said optical receiver;

a detection signal demodulator for demodulating the modulated detection signal outputted from said separator to output the phase-adjusted detection signal;

a phase reproducer for adjusting a phase of the phase-adjusted detection signal outputted said detection signal demodulator to output the detection signal before phase adjustment; and an amplitude adjuster for adjusting, by referring to the detection signal outputted from said phase reproducer, an amplitude of the suppressed multiplexed signal outputted from said separator to output the frequency-multiplexed signal corresponding to the frequency-multiplexed signal provided to said detector.

15. The optical transmission system according to claim 14, wherein said amplitude controller adjusts an instantaneous amplitude of the frequency-multiplexed signal to be held under a predetermined value.

16. The optical transmission system according to claim 14, wherein an entire or part of an occupied frequency band of the modulated detection signal outputted from said detection signal modulator is different from an occupied frequency band of the suppressed multiplexed signal obtained in said multiplexer.

17. The optical transmission system according to claim 14, wherein said phase adjuster adjusts the phase of the detection signal so that instantaneous amplitude variations of the suppressed multiplexed signal and the modulated detection signal multiplexed in said multiplexer are opposite in polarity.

* * * * *